(12) United States Patent
Rowland et al.

(10) Patent No.: US 7,755,015 B2
(45) Date of Patent: Jul. 13, 2010

(54) REAL-TIME MULTIPLICITY COUNTER

(75) Inventors: Mark S. Rowland, Alamo, CA (US); Raymond A. Alvarez, Berkeley, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 78 days.

(21) Appl. No.: 12/047,297

(22) Filed: Mar. 12, 2008

(65) Prior Publication Data

US 2008/0205580 A1 Aug. 28, 2008

Related U.S. Application Data

(63) Continuation-in-part of application No. 11/257,607, filed on Oct. 24, 2005, now abandoned.

(60) Provisional application No. 60/621,105, filed on Oct. 22, 2004.

(51) Int. Cl.
 *G01T 3/00* (2006.01)
 *G06M 11/00* (2006.01)
 *G21C 17/00* (2006.01)

(52) U.S. Cl. .......... 250/207; 250/390.01; 250/391; 376/254; 377/10

(58) Field of Classification Search ........ 250/207, 250/390.01, 390.11, 390.12, 391, 392; 376/254; 377/10

See application file for complete search history.

(56) References Cited

U.S. PATENT DOCUMENTS

| | | | | |
|---|---|---|---|---|
| 3,991,611 A | * | 11/1976 | Marshall et al. | 340/855.5 |
| 4,766,543 A | * | 8/1988 | Schmidt | 702/8 |
| 7,383,142 B2 | * | 6/2008 | Scoullar et al. | 702/66 |
| 7,411,198 B1 | * | 8/2008 | Holland et al. | 250/370.01 |
| 7,521,682 B1 | * | 4/2009 | Holland et al. | 250/370.01 |
| 2006/0081787 A1 | * | 4/2006 | Prasad et al. | 250/391 |
| 2006/0146977 A1 | * | 7/2006 | Rowland et al. | 377/10 |
| 2006/0284100 A1 | * | 12/2006 | Bak | 250/369 |
| 2007/0076848 A1 | * | 4/2007 | Walter et al. | 378/98.8 |
| 2007/0230651 A1 | * | 10/2007 | Rowland et al. | 376/254 |
| 2008/0205580 A1 | * | 8/2008 | Rowland et al. | 377/11 |
| 2009/0114835 A1 | * | 5/2009 | Prasad et al. | 250/391 |

* cited by examiner

*Primary Examiner*—John R Lee
(74) *Attorney, Agent, or Firm*—John P. Wooldrige; John H. Lee

(57) ABSTRACT

A neutron multi-detector array feeds pulses in parallel to individual inputs that are tied to individual bits in a digital word. Data is collected by loading a word at the individual bit level in parallel. The word is read at regular intervals, all bits simultaneously, to minimize latency. The electronics then pass the word to a number of storage locations for subsequent processing, thereby removing the front-end problem of pulse pileup.

7 Claims, 38 Drawing Sheets

Neutron Counting Requirements Matrix

Trigger Mode 1

Data Acquisition Cycles initiated by periodic internal triggers

Normally used for passive measurements on naturally radioactive samples.

Measurement Class A

Record Neutron Multiplicities
"Feynman Variance" Analysis

Data Mode 1.A

Record neutron multiplicities in various time subgates during each Data Acquisition Cycle (DAC) comprising a single Data Acquisition Gate (DAG), containing 512 primary time bins.

Mode 1.A.1: Uses "Efficient" subgate array.
Mode 1.A.2: Uses "Inefficient" subgate array.

Measurement Class B

Record Neutron-Pair
Time Intervals

Data Mode 1.B

Record neutron-pair time interval distributions during each DAC, which comprises two successive Data Acquisition Gates (1024 time bins).

Uses "Inefficient" interval sorting algorithm.

Rossi-α Analysis

FIG. 1A

Trigger Mode 2
Data Acquisition Cycles initiated either by periodic internal triggers or by external triggers Can be used for either passive measurements or measurements with periodic neutron generators.

---

Data Mode 2.A

Record neutron multiplicities in various time subgates during each DAC, which comprises a single DAG (containing 512 primary time bins), which begins after a user selected delay following the trigger.

Uses "Inefficient" subgate array.

---

Data Mode 2.B

Record time interval distributions between neutron pairs during each DAC, which comprises a single DAG. The DAG consists of 512 counting bins. Recorded pairs can be limited to a subgate with user-selected length and delay from the trigger.

Uses "Inefficient" interval sorting algorithm.

FIG. 1B

Measurement Class C

Time Dependence

> Not Applicable

Width of primary time bins is adjustable, ≥ 1 μs.

Aggregate data for either trigger mode are compiled at the end of each run, which consists of a user-selected number of data acquisition cycles.

FIG. 1C

Data Mode 2.C

Record the number of multiplets of each multiplicity ($\leq 256$) in each time bin during each DAC comprising a single DAG. The DAG begins after an adjustable delay following the trigger; it consists of 512 time bins.

Multiplet Die-Away Analysis

FIG. 1D

MODE 1.A

NATURAL RADIOACTIVITY-INTERNAL PERIODIC TRIGGER MULTIPLICITY MEASUREMENTS - "FEYNMAN VARIANCE" ANALYSIS "EFFICIENT" SUBGATE ARRAY (NAKAE ALGORITHM)

● = DETECTED NEUTRON

LEVEL-1 SUBGATES
$\tau_1 = \tau_0$

LEVEL-2 SUBGATES
$\tau_2 = 2\tau_1 = 2\tau_0$

LEVEL-3 SUBGATES
$\tau_3 = 2\tau_2 = 2^2\tau_0$

LEVEL-4 SUBGATES
$\tau_4 = 2\tau_3 = 2^3\tau_0$
ETC.

LEVEL-10 SUBGATE
$\tau_9 = 2\tau_8 = 2^8\tau_0$

COUNTS ARE ALSO SUMMED IN SUBGATES OF THREE ADDITIONAL LENGTHS (192, 320 & 384 μs) WHICH DO NOT FIT NEATLY INTO THE SCHEME OF SHOWN DIAGRAM.

FIG. 4A

BIN # SUBGATE COUNT TALLY FOR MODE 1.A

| BIN # | 1 | 2 | 3 | 4 | 5 | 6 |
|---|---|---|---|---|---|---|
| NO. OF COUNTS IN BIN (M): | 0 | 1 | 0 | 1 | 0 | 0 |
| LEVEL-1 SUBGATE ($\mu$): | G(1,1) | G(1,2) | G(1,3) | G(1,4) | G(1,5) | G(1,6) |
| NO. COUNTS IN SUBGATE ($\mu$): | 0 | 1 | 0 | 1 | 0 | 0 |
| LEVEL-2 SUBGATE | G(2,1) | G(2,2) | G(2,3) | G(2,4) | G(2,4) | G(2,6) |
| NO. OF COUNTS IN SUBGATE ($\mu$): | 1 | 1 | 1 | 1 | 0 | 2 |
| LEVEL-3 SUBGATE | G(3,1) | G(3,2) | G(3,3) | G(3,4) | G(3,5) | G(3,6) |
| NO. OF COUNTS IN SUBGATE ($\mu$): | 2 | 1 | 2 | 2 | 2 | 2 |
| LEVEL-4 SUBGATE | G(4,1) | G(4,2) | G(4,3) | G(4,3) | | |
| NO. OF COUNTS IN SUBGATE ($\mu$): | 4 | 4 | 2 | | | |
| LEVEL-5 SUBGATE | G(5,1) | | | | | |
| NO. OF COUNTS IN SUBGATE ($\mu$): | 6 | | | | | |

NOTE: BECAUSE OF - COUNTING -
BECAUSE OF THE ARTIFICIAL - G(5,2) CANNOT BE -

EXAMPLE OF DATA MATRIX FOR MODE 1.A

MULTIPLICITIES ($\mu = 0 - \mu = \mu MAX$) OCCURRING IN SUBGATES OF VARIOUS WIDTHS ON THIS DAC.

THIS EXAMPLE CONSIDERS ONLY A SINGLE DATA ACQUISITION CYCLE (WITH COUNTS AS ILLUSTRATED); ONLY THE FIRST 18 COUNTING BINS ARE CONSIDERED IN THIS EXAMPLE.

| SUBGATE LEVEL | 1 | 2 | 3 | 4 | 5 | 6 | 7 | 8 | 9 |
|---|---|---|---|---|---|---|---|---|---|
| NO. OF SUBGATES CONSIDERED | 18 | 17 | 8 | 3 | 2 | | SUBGATE LEVELS >5 NOT EVALUATED IN THIS EXAMPLE | | |
| SUBGATE WIDTHS (UNITS OF $\tau_0$): | 1 | 2 | 4 | 8 | 16 | 32 | 64 | 128 | 256 |

FIG. 5A

| 7 | 8 | 9 | 10 | 11 | 12 | 13 | 14 | 15 | 16 | 17 | 18 |
|---|---|---|---|---|---|---|---|---|---|---|---|
| 2 | 0 | 0 | 0 | 1 | 1 | 0 | 0 | 0 | 0 | 1 | 0 |
| G(1,7) | G(1,8) | G(1,9) | G(1,10) | G(1,11) | G(1,12) | G(1,13) | G(1,14) | G(1,15) | G(1,16) | G(1,17) | G(1,18) |
| 2 | 0 | 0 | 0 | 1 | 1 | 0 | 0 | 0 | 0 | 1 | 0 |
| G(2,7) | G(2,8) | G(2,9) | G(2,10) | G(2,11) | G(2,12) | G(2,13) | G(2,14) | G(2,15) | G(2,16) | G(2,17) | |
| 2 | 0 | 0 | 1 | 2 | 1 | 0 | 0 | 0 | 1 | 1 | |
| G(3,7) | G(3,8) | | | | | | | | | | |
| 0 | | | | | | | | | | | |

NOTE: BECAUSE OF THE ARTIFICIAL LIMITATION OF CONSIDERING ONLY THE FIRST 18 COUNTING BINS, G(3,9) CANNOT BE EVALUATED IN THIS IMPLEMENTATION EXAMPLE.
BINS G(4,4) CANNOT BE EVALUATED IN THIS IMPLEMENTATION EXAMPLE.

- THE ARTIFICIAL LIMITATION OF CONSIDERING ONLY THE FIRST 18 COUNTING BINS
- LIMITATION OF CONSIDERING ONLY THE FIRST 18 COUNTING BINS
- EVALUATED IN THIS IMPLEMENTATION EXAMPLE.

FIG. 5B

| SUBGATE MULTIPLICITY | $\mu$ | 0 | 1 | 2 | 3 | 4 | 5 | 6 | 7 | |
|---|---|---|---|---|---|---|---|---|---|---|
| "ZEROS" | 0 | 12 | 6 | 1 | 0 | 0 | 0 | 0 | 0 | |
| "SINGLES" | 1 | 5 | 8 | 2 | 0 | 0 | 0 | 0 | 0 | |
| "DOUBLES" | 2 | 1 | 3 | 5 | 1 | 0 | 0 | 0 | 0 | |
| "TRIPLES" | 3 | 0 | 0 | 0 | 0 | 0 | 0 | 0 | 0 | |
| | 4 | 0 | 0 | 0 | 0 | 2 | 0 | 0 | 0 | |
| ETC. | 5 | 0 | 0 | 0 | 0 | 0 | 0 | 0 | 0 | |
| | 6 | 0 | 0 | 0 | 0 | 0 | 0 | 0 | 0 | |
| | 7 | 0 | 0 | 0 | 0 | 0 | 1 | 0 | 0 | |
| ETC. (TO $\mu$ MAX) | | | | | | | | | | |

SUBGATE LEVELS > 5 NOT EVALUATED IN THIS EXAMPLE

EACH ELEMENT IN CUMULATIVE DATA MATRIX IS INCREMENTED, AFTER EACH DATA ACQUISITION CYCLE, FOR DURATION OF THE MEASUREMENT. COLLECT ONE DATA ARRAY.

FIG. 5C

BIN COUNT TALLY AND INTERVAL FREQUENCY ARRAY FOR MODE 1.B

ILLUSTRATIVE DATA SAMPLE FOR A SINGLE 1024 BIN DAC

| BIN # | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| COUNTS | 0 | 2 | 0 | 1 | 0 | 0 | 1 | 0 | 0 | 0 | 0 | 0 | 0 | 0 |

INTERVAL TABULATION FOR THE SINGLE DAC SHOWN  NOTATION: (b2 = BIN #2 ETC.)

| INTERVAL | | | |
|---|---|---|---|
| b2-b2 | δ(2,2) | = | 0 |
| b2-b4 | δ(2,4) | = | 2 |
| b2-b7 | δ(2,7) | = | 5 |
| b2-b17 | δ(2,17) | = | 15 |
| b2-b17 | δ(2,17) | = | 15 |
| b2-b508 | δ(2,508) | = | 506 |
| b2-b518 | δ(2,518) | = | 516 |
| b2-b518 | δ(2,518) | = | 516 |
| b2-b1017 | δ(2,1017) | = | 1015 |
| ETC. | | | |

FIG. 7A

CASE 2 "TYPE II" ANALYZER MODE

| 15 | 16 | 17 | 18 | ... | 508 | ... | 512 | 513 | ... | 518 | ... | 1017 | ... | 1024 |
|----|----|----|----|-----|-----|-----|-----|-----|-----|-----|-----|------|-----|------|
| 0  | 0  | 2  | 0  | ... | 1   | ... | 0   | 0   | ... | 2   | ... | 1    | ... | 0    |

FIG. 7B

| FREQUENCY OF TIME INTERVALS BETWEEN NEUTRON PAIRS WITH $0 \leq \Delta t \leq 1024\, \tau_0$; "INEFFICIENT" SORTING ALGORITHM. | | | | | | | | | |
|---|---|---|---|---|---|---|---|---|---|
| THIS EXAMPLE CONSIDERS ONLY A SINGLE 1024 BIN DATA ACQUISITION CYCLE (WITH COUNTS AS ILLUSTRATED) | | | | | | | | | |
| TIME INTERVAL, $\Delta t$: | 0-$\tau_0$ | 1-$\tau_0$ | 2-$\tau_0$ | 3-$\tau_0$ | 4-$\tau_0$ | 5-$\tau_0$ | 6-$\tau_0$ | 7-$\tau_0$ | ... |
| NO. OF INTERVALS: | 1 | 1 | 1 | 0 | 0 | 1 | 1 | 0 | ... |
| VIRTUAL TRIGGER BIN: | 1 | 2 | 3 | 4 | 5 | ... | 1024 | | |
| NO. OF VIRTUAL TRIGGERS: | 0 | 0 | 0 | 0 | 0 | ... | 0 | | |

EACH ELEMENT IN A SIMILAR CUMULATIVE DATA ARRAY IS TO BE INCREMENTED, AFTER EACH DATA ACQUISITION CYCLE, FOR THE DURATION OF THE MEASUREMENT

IN THE TYPE-II ANALYSIS MODE, ONLY ONE NEUTRON (IN THE LOWEST-NUMBERED OCCUPIED BIN IN THE DUAL DAG) IS CONSIDERED THE VIRTUAL TRIGGER NEUTRON. IF ONLY A SINGLE NEUTRON IS DETECTED ON A DAC, THE CUMULATIVE VIRTUAL TRIGGER BIN ARRAY IS INCREMENTED EVEN THERE ARE NO VALID NEUTRON-PAIR INTERVALS FOR THAT DAC.

FIG. 7C

| 15-$T_0$ | ... | 506-$T_0$ | ... | 516-$T_0$ | ... | 1015-$T_0$ | ... | 1024-$T_0$ |
| --- | --- | --- | --- | --- | --- | --- | --- | --- |
| 2 | ... | 1 | ... | 2 | ... | 1 | ... | 0 |

EACH ELEMENT IN A SIMILAR CUMULATIVE DATA ARRAY IS TO BE INCREMENTED, AFTER EACH DATA ACQUISITION CYCLE, FOR THE DURATION OF THE MEASUREMENT.

COLLECT TWO DATA VECTORS.

FIG. 7D

| BIN-COUNT TALLY AND INTERVAL FREQUENCY ARRAY FOR MODE 1.B | | | | | | | | | | | | |
|---|---|---|---|---|---|---|---|---|---|---|---|---|
| ILLUSTRATIVE DATA SAMPLE FOR A SINGLE 1024-BIN DAC | | | | | | | | | | | | |
| BIN # | 1 | 2 | 3 | 4 | 5 | 6 | 7 | 8 | 9 | 10 | 11 | 12 |
| COUNTS | 0 | 2 | 0 | 1 | 0 | 0 | 1 | 0 | 0 | 0 | 0 | 0 |
| | | | | | | | | | | | | |
| INTERVAL TABULATION FOR THE SINGLE DAC SHOWN NOTATION(b2-BIN#2 ETC.) | | | | | | | | | | | | |
| INTERVAL | | | | | | | | | | | | |
| b2-b2 | $\delta$(2,2) | = | $T_0$ | (2,2) | = | $T_0$ | 0 | | | | | |
| b2-b4 | $\delta$(2,4) | = | $T_0$ | (4,2) | = | $T_0$ | 2 | | | | | |
| b2-b7 | $\delta$(2,7) | = | $T_0$ | (7,2) | = | $T_0$ | 5 | | | | | |
| b2-b17 | $\delta$(2,17) | = | $T_0$ | (17,2) | = | $T_0$ | 15 | | | | | |
| b2-b17 | $\delta$(2,17) | = | $T_0$ | (17,2) | = | $T_0$ | 15 | | | | | |
| b2-b508 | $\delta$(2,508) | = | $T_0$ | (508,2) | = | $T_0$ | 508 | | | | | |
| b2-b518 | $\delta$(2,518) | = | $T_0$ | (518,2) | = | $T_0$ | 516 | | | | | |
| b2-b518 | $\delta$(2,518) | = | $T_0$ | (518,2) | = | $T_0$ | 516 | | | | | |
| b2-b1017 | $\delta$(2,1017) | = | $T_0$ | (1017,2) | = | $T_0$ | 1015 | | | | | |
| ETC. | | | | | | | | | | | | |

FIG. 9A

| FREQUENCY OF TIME INTERVALS BETWEEN NEUTRON PAIRS WITH $0 \leq \Delta t \leq 1024 \tau_0$; "INEFFICIENT" SORTING ALGORITHM. THIS EXAMPLE CONSIDERS ONLY A SINGLE 1024 BIN DATA ACQUISITION CYCLE (WITH COUNTS AS ILLUSTRATED) | | | | | | | | |
|---|---|---|---|---|---|---|---|---|
| TIME INTERVAL, $\Delta t$: | $0 - \tau_0$ | $1 - \tau_0$ | $2 - \tau_0$ | $3 - \tau_0$ | $4 - \tau_0$ | $5 - \tau_0$ | $6 - \tau_0$ | $7 - \tau_0$ |
| NO. OF INTERVALS: | 1 | 1 | 1 | 0 | 0 | 1 | 0 | 0 |
| VIRTUAL TRIGGER BIN: | 1 | 2 | 3 | 4 | 5 | ... | 1024 |
| NO. OF VIRTUAL TRIGGERS: | 0 | 0 | 0 | 0 | 0 | ... | 0 |

EACH ELEMENT IN A SIMILAR CUMULATIVE DATA ARRAY IS TO BE INCREMENTED, AFTER EACH DATA ACQUISITION CYCLE, FOR THE DURATION OF THE MEASUREMENT

IN THE TYPE-II ANALYSIS MODE, ONLY ONE NEUTRON (IN THE LOWEST-NUMBERED OCCUPIED BIN IN THE DUAL DAG) IS CONSIDERED THE VIRTUAL TRIGGER NEUTRON. IF ONLY A SINGLE NEUTRON IS DETECTED ON A DAC, THE CUMULATIVE VIRTUAL TRIGGER BIN ARRAY IS INCREMENTED EVEN THERE ARE NO VALID NEUTRON-PAIR INTERVALS FOR THAT DAC.

FIG. 9C

| ... | 15-$T_0$ | ... | 506-$T_0$ | ... | 516-$T_0$ | ... | 1015-$T_0$ | ... | 1024-$T_0$ |
|---|---|---|---|---|---|---|---|---|---|
| ... | 2 | ... | 1 | ... | 2 | ... | 1 | ... | 0 |

EACH ELEMENT IN A SIMILAR CUMULATIVE DATA ARRAY IS TO BE INCREMENTED, AFTER EACH DATA ACQUISITION CYCLE, FOR THE DURATION OF THE MEASUREMENT.

COLLECT TWO DATA VECTORS.

FIG. 9D

BIN AND SUBGATE COUNT TALLY FOR MODE 2.A

| BIN # | 1 | 2 | 3 | 4 | 5 | 6 | 7 | 8 | 9 | 10 |
|---|---|---|---|---|---|---|---|---|---|---|
| NO. OF COUNT IN BIN (m) | 0 | 1 | 0 | 1 | 0 | 0 | 2 | 0 | 0 | 0 |
| SUBGATE | G1 | G2 | G3 | G4 | G5 | G6 | G7 | G8 | G9 | G10 |
| SUBGATE WIDTH (UNITS OF $\tau_0$) | 0 | 1 | 2 | 3 | 4 | 5 | 6 | 7 | 8 | 9 |
| NO. OF COUNTS IN SUBGATE (μ) | 0 | 1 | 1 | 2 | 2 | 2 | 4 | 4 | 4 | 4 |

EXAMPLE OF DATA MATRIX FOR MODE 2.A

MULTIPLICITIES (μ = 0, μ = 1... μMAX) OCCURING IN SUBGATES OF VARIOUS-
THIS EXAMPLE CONSIDERS ONLY A SINGLE DATA ACQUISITION CYCLE-
-1ST 18 COUNTING BINS ARE CONSIDERED IN THIS EXAMPLE.

| SUBGATE WIDTH (UNITS OF $\tau_0$) | 1 | 2 | 3 | 4 | 5 | 6 | 7 | 8 | 9 | 10 |
|---|---|---|---|---|---|---|---|---|---|---|
| SUBGATE MULTIPLICITY μ | | | | | | | | | | |
| "ZEROS" 0 | 1 | 0 | 0 | 0 | 0 | 0 | 0 | 0 | 0 | 0 |
| "SINGLES" 1 | 0 | 1 | 1 | 1 | 1 | 1 | 1 | 1 | 1 | 0 |
| "DOUBLES" 2 | 0 | 0 | 0 | 0 | 0 | 0 | 0 | 0 | 0 | 0 |
| "TRIPLES" 3 | 0 | 0 | 0 | 0 | 0 | 0 | 0 | 0 | 0 | 0 |
| 4 | 0 | 0 | 0 | 0 | 0 | 1 | 1 | 1 | 1 | 1 |
| ETC. 5 | 0 | 0 | 0 | 0 | 0 | 0 | 0 | 0 | 0 | 0 |
| 6 | 0 | 0 | 0 | 0 | 0 | 0 | 0 | 0 | 0 | 0 |
| ETC. (TO μMAX) 7 | 0 | 0 | 0 | 0 | 0 | 0 | 0 | 0 | 0 | 0 |

FIG. 11A

"INEFFICIENT" SORTING ALGORITHM

| 11 | 12 | 13 | 14 | 15 | 16 | 17 | 18 | ... | (TO 512) |
|----|----|----|----|----|----|----|----|-----|----------|
| 1  | 1  | 0  | 0  | 0  | 0  | 1  | 0  | ... |          |

| G11 | G12 | G13 | G14 | G15 | G16 | G17 | G18 | ... | (TO G512) |
|-----|-----|-----|-----|-----|-----|-----|-----|-----|-----------|
| 10  | 11  | 12  | 13  | 14  | 15  | 16  | 17  | ... |           |
| 5   | 6   | 6   | 6   | 6   | 6   | 7   | 7   | ... |           |

—WIDTHS ON THIS DAC
—(WITH COUNTS AS ILLUSTRATED): ONLY THE—

| 11 | 12 | 13 | 14 | 15 | 16 | 17 | 18 | ... | (TO 512) |
|----|----|----|----|----|----|----|----|-----|----------|
| 0  | 0  | 0  | 0  | 0  | 0  | 0  | 0  | ... |          |
| 0  | 0  | 0  | 0  | 0  | 0  | 0  | 0  | ... |          |
| 0  | 0  | 0  | 0  | 0  | 0  | 0  | 0  | ... |          |
| 0  | 0  | 0  | 0  | 0  | 0  | 0  | 0  | ... |          |
| 0  | 0  | 0  | 0  | 0  | 0  | 0  | 0  | ... |          |
| 1  | 0  | 1  | 1  | 1  | 1  | 0  | 0  | ... |          |
| 0  | 1  | 0  | 0  | 0  | 1  | 1  | 1  | ... |          |
| 0  | 0  | 0  | 0  | 0  | 0  | 0  | 1  | ... |          |

EACH ELEMENT IN CUMULATIVE DATA MATRIX IS INCREMENTED AFTER EACH DATA ACQUISITION CYCLE, FOR DURATION OF THE MEASUREMENT.
COLLECT ONE DATA ARRAY.

FIG. 11B

BIN-COUNT TALLY AND INTERVAL FREQUENCY ARRAY FOR MODE 2.B

ILLUSTRATIVE DATA SAMPLE FOR A SINGLE DAC

DAG-2

| BIN # | 1 | 2 | 3 | 4 | 5 | 6 | ... | k-3 | ... | k | k+1 | k+2 | k+3 |
|---|---|---|---|---|---|---|---|---|---|---|---|---|---|
| COUNTS | 0 | 0 | 1 | 0 | 2 | 0 | ... | 1 | ... | 0 | 0 | 0 | 2 |

SORT DATA IN THIS →

NOTE: THIS EXAMPLE IS THE ANALOG OF MODE 1.B CASE 2 TWO NEUTRONS IN THE FIRST POPULATED BIN IN THE SORTING RANGE.

INTERVAL TABULATION FOR THE SINGLE DAC SHOWN

| INTERVAL | |
|---|---|
| $\delta[(k+3),(k+3)]$ | = 0 $\tau_0$ |
| $\delta[(k+3),(k+5)]$ | = 2 $\tau_0$ |
| $\delta[(k+3),(k+10)]$ | = 7 $\tau_0$ |
| $\delta[(k+3),(k+14)]$ | = 11 $\tau_0$ |
| $\delta[(k+3),(k+14)]$ | = 11 $\tau_0$ |
| $\delta[(k+3),(k+21)]$ | = 18 $\tau_0$ |
| $\delta[(k+3),(508)]$ | = (508-(k+3)) $\tau_0$ |
| ETC. | |

FREQUENCY OF TIME INTERVALS WITH $0 \leq \Delta t \leq 512 \tau_0$

THIS EXAMPLE CONSIDERS ONLY A SINGLE DATA ACQUISITION CYCLE

| TIME INTERVAL, $\Delta t$ | 0$\tau_0$ | 1$\tau_0$ | 2$\tau_0$ | 3$\tau_0$ | 4$\tau_0$ | 5$\tau_0$ | 6$\tau_0$ | 7$\tau_0$ | 8$\tau_0$ | 9$\tau_0$ | 10$\tau_0$ | 11$\tau_0$ | ... | 117$\tau_0$ | 512$\tau_0$ |
|---|---|---|---|---|---|---|---|---|---|---|---|---|---|---|---|
| NO. OF INTERVALS: | 1 | 0 | 1 | 0 | 0 | 0 | 0 | 1 | 0 | 0 | 0 | 1 | ... | 2 | 0 |

EACH ELEMENT IN CUMULATIVE DATA MATRIX IS INCREMENTED, AFTER EACH DATA ACQUISITION CYCLE, FOR DURATION OF THE MEASUREMENT. COLLECT ONE DATA ARRAY.

FIG. 13A

| | | | DAG-2 | | | | | | |
|---|---|---|---|---|---|---|---|---|---|
| k+4 | k+5 | ... | k+10 | ... | k+14 | ... | k+21 | ... | 508 | 509 | 510 | 511 | 512 |
| 0 | 1 | ... | 1 | ... | 2 | ... | 1 | ... | 1 | 0 | 0 | 1 | 0 |

—BIN RANGE, ONLY (WITH COUNTS AS ILLUSTRATED)

| 13 To 14 | 14 To 15 | 15 To 16 | 16 To 17 | 17 To 18 | 18 To 19 | 19 To 20 | ... | [508-(k+3)] To ... | ... | 512 To ... |
|---|---|---|---|---|---|---|---|---|---|---|
| 0 | 0 | 0 | 0 | 0 | 1 | 0 | ... | 1 | ... | 0 |

FIG. 13B

BIN AND SUBGATE COUNT TALLY FOR MODE 2.C

| BIN # | 1 | 2 | 3 | 4 | 5 | 6 | 7 |
|---|---|---|---|---|---|---|---|
| TIME AFTER START OF DAG (UNITS OF $t_0$) | 0 | 1 | 2 | 3 | 4 | 5 | 6 |
| BIN MULTIPLICITY (m) = NO. OF COUNTS IN BIN: | 0 | 1 | 0 | 1 | 0 | 0 | 2 |

EXAMPLE OF DATA MATRIX FOR MODE 2.C

FREQUENCY OF MULTIPLETS OF MULTIPLICITY m OCCURING IN THIS EXAMPLE CONSIDERS ONLY A SINGLE DATA ACQUISITION CYCLE — COUNTING BINS ARE CONSIDERED.

| TIME t AFTER START OF DAG (UNITS OF $t_0$) | 0 | 1 | 2 | 3 | 4 | 5 | 6 |
|---|---|---|---|---|---|---|---|
| COUNTING BIN MULTIPLICITY (m) | | | | | | | |
| 0 | 1 | 0 | 1 | 0 | 1 | 1 | 0 |
| 1 | 0 | 1 | 0 | 1 | 0 | 0 | 0 |
| 2 | 0 | 0 | 0 | 0 | 0 | 0 | 1 |
| 3 | 0 | 0 | 0 | 0 | 0 | 0 | 0 |
| 4 | 0 | 0 | 0 | 0 | 0 | 0 | 0 |
| 5 | 0 | 0 | 0 | 0 | 0 | 0 | 0 |
| 6 | 0 | 0 | 0 | 0 | 0 | 0 | 0 |
| 7 | 0 | 0 | 0 | 0 | 0 | 0 | 0 |

EACH ELEMENT IN CUMULATIVE DATA MATRIX IS INCREMENTED, AFTER EACH DATA ACQUISITION CYCLE, FOR DURATION OF THE MEASUREMENT. COLLECT ONE DATA ARRAY.

FIG.15A

| | 8 | 9 | 10 | 11 | 12 | 13 | 14 | 15 | 16 | 17 | 18 | ... | (TO 512) |
|---|---|---|---|---|---|---|---|---|---|---|---|---|---|
| | 7 | 8 | 9 | 10 | 11 | 12 | 13 | 14 | 15 | 16 | 17 | ... | (TO 511) |
| | 0 | 0 | 0 | 1 | 1 | 0 | 0 | 0 | 1 | 1 | 0 | | |

—TIME BIN AT TIME t AFTER START OF DAG—
(WITH COUNTS AS ILLUSTRATED) ONLY THE 1ST 18

| | 7 | 8 | 9 | 10 | 11 | 12 | 13 | 14 | 15 | 16 | 17 | ... | (TO 511) |
|---|---|---|---|---|---|---|---|---|---|---|---|---|---|
| | 1 | 1 | 1 | 0 | 1 | 1 | 1 | 1 | 1 | 0 | 1 | | |
| | 0 | 0 | 0 | 1 | 0 | 0 | 0 | 0 | 0 | 1 | 0 | | |
| | 0 | 0 | 0 | 0 | 0 | 0 | 0 | 0 | 0 | 0 | 0 | | |
| | 0 | 0 | 0 | 0 | 0 | 0 | 0 | 0 | 0 | 0 | 0 | | |
| | 0 | 0 | 0 | 0 | 0 | 0 | 0 | 0 | 0 | 0 | 0 | | |
| | 0 | 0 | 0 | 0 | 0 | 0 | 0 | 0 | 0 | 0 | 0 | | |
| | 0 | 0 | 0 | 0 | 0 | 0 | 0 | 0 | 0 | 0 | 0 | | |

FIG. 15B

REAL-TIME MULTIPLICITY COUNTER

This application is a continuation-in-part of U.S. application Ser. No. 11/257,607, filed Oct. 24, 2005 now abandoned, incorporated herein by reference, which claims the benefit of U.S. Provisional Application No. 60/621,105, filed Oct. 22, 2004, incorporated herein by reference.

The United States Government has rights in this invention pursuant to Contact No. DE-AC52-07NA27344 between the United States Department of Energy and Lawrence Livermore National Security, LLC.

BACKGROUND OF THE INVENTION

1. Field of the Invention

The present invention relates neutron multiplicity counting techniques, and more specifically, it relates to such a neutron multiplicity counting technique that reduces pulse pile up dead time.

2. Description of Related Art

The standard approach to neutron multiplicity counting is through the use of a "shift register" sliding word that is gated and counted repeatedly. Usually this gives data for one gate width. The shift register is a one input device where pulses can pile up and be lost.

Another approach is a list mode data acquisition system. Every pulse is assigned a time fiducial and stored as a word. The volume of data that accumulates is many gigabytes if the objective is a non-destructive assay. A large quantity of data is required to minimize statistical errors.

Neutron detection is the effective detection of neutrons entering a well-positioned detector. There are two key aspects to effect In this step lies the crucial point of the analysis: the extracted ionization values are plotted. Specifically, the graph plots energy deposition in the tail against energy deposition in the entire signal for a range of neutron energies. Typically, for a given energy, there are many events with the same tail-energy value. In this case, plotted points are simply made denser with more overlapping dots on the two-dimensional plot, and can thus be used to eyeball the number of events corresponding to each energy-deposition. A considerable random fraction (1/30) of all events is plotted on the graph.

If the tail size extracted is a fixed proportion of the total pulse, then there will be two lines on the plot, having different slopes. The line with the greater slope will correspond to photon events and the line with the lesser slope to neutron events. This is precisely because the photon energy deposition current, plotted against time, leaves a longer "tail" than does the neutron deposition plot, giving the photon tail more proportion of the total energy than neutron tails.

The effectiveness of any detection analysis can be seen by its ability to accurately count and separate the number of neutrons and photons striking the detector. Also, the effectiveness of the second and third steps reveals whether event rates in the experiment are manageable. If clear plots can be obtained in the above steps, allowing for easy neutron-photon separation, the detection can be termed effective and the rates manageable. On the other hand, smudging and indistinguishability of data points will not allow for easy separation of events.

Detection rates can be kept low in many ways. Sampling of events can be used to choose only a few events for analysis. If the rates are so high that one event cannot be distinguished from another, physical experimental parameters (shielding, detector-target distance, solid-angle, etc.) can be manipulated to give the lowest rates possible and thus distinguishable events.

It is important here to observe precisely those variables that matter, since there may be false indicators along the way. For example, ionization currents might get periodic high surges, which do not imply high rates but just high energy depositions for stray events. These surges will be tabulated and viewed with cynicism if unjustifiable, especially since there is so much background noise in the setup.

One might ask how experimenters can be sure that every current pulse in the oscilloscope corresponds to exactly one event. This is true because the pulse lasts about 50 ns, allowing for a maximum of $2 \times 10^7$ events every second. This number is much higher than the actual typical rate, which is usually an order of magnitude less, as mentioned above. This means that is it highly unlikely for there to be two particles generating one current pulse. The current pulses last 50 ns each, and start to register the next event after a gap from the previous event.

Although sometimes facilitated by higher incoming neutron energies, neutron detection is generally a difficult task, for all the reasons stated earlier. Thus, better scintillator design is also in the foreground and has been the topic of pursuit ever since the invention of scintillation detectors. Scintillation detectors were invented in 1903 by Crookes but were not very efficient until the PMT (photomultiplier tube) was developed by Curran and Baker in 1944. The PMT gives a reliable and efficient method of detection since it multiplies the detection signal tenfold. Even so, scintillation design has room for improvement as do other options for neutron detection besides scintillation.

Detection hardware refers to the kind of neutron detector used (the most common today is the scintillation detector) and to the electronics used in the detection setup. Further, the hardware setup also defines key experimental parameters, such as source-detector distance, solid angle and detector shielding. Detection software consists of analysis tools that perform tasks such as graphical analysis to measure the number and energies of neutrons striking the detector.

Experiments that make use of this science are typically scattering experiments whose scattered particles of interest are neutrons. Perhaps the most noteworthy among these experiments is the trademark experiment of the European Muon Collaboration, first performed at CERN and now termed the "EMC experiment." The same experiment is performed today with more sophisticated equipment to obtain more definite results related to the original EMC effect.

Neutron detection is also used at nuclear reactors and where californium-252 is used as a neutron source. Neutrons are a fundamental part of any experiment or technique involving nuclear fission, and thus detection of neutrons is an important part of the radiation protection strategy of such establishments.

Neutron detection is used for varying purposes. Each application has different requirements for the detection system. For reactor instrumentation, neutron flux is an important measure of power in nuclear power and research reactors. Boiling water reactors may have dozens of neutron detectors, one per fuel assembly. Most neutron detectors used in nuclear reactors are optimized to detect thermal neutrons. In particle physics, neutron detection has been proposed as a method of enhancing neutrino detectors. Neutron radiation is a hazard in nuclear reactors. Neutron detectors used for radiation safety must take into account the way damage caused by neutrons varies with energy. Secondary neutrons are one component of particle showers produced in Earth's atmosphere by cosmic rays. Dedicated ground-level neutron detectors, namely neutron monitors, are employed to monitor variations in cosmic ray flux.

Neutron detection is not an easy science. The major challenges faced by modern-day neutron detection include background noise, high detection rates, neutron neutrality, and low neutron energies.

The main components of background noise in neutron detection are high-energy photons, which aren't easily eliminated by physical barriers. The other sources of noise, such as alpha and beta particles, can be eliminated by various shielding materials, such as lead, plastic, thermo-coal, etc. Thus, photons cause major interference in neutron detection, since it is uncertain if neutrons or photons are being detected by the neutron detector. Both register similar energies after scattering into the detector from the target or ambient light, and are thus hard to distinguish. Coincidence detection can also be used to discriminate real neutron events from photons and other radiation.

Since the detector lies in a region of high beam activity, it is hit continuously by neutrons and background noise at overwhelmingly high rates. This obfuscates collected data, since there is extreme overlap in measurement, and separate events are not easily distinguished from each other. Thus, part of the challenge lies in keeping detection rates as low as possible and in designing a detector that can keep up with the high rates to yield coherent data.

Neutrality of Neutrons

Neutrons are neutral and thus do not respond to electric fields. This makes it hard to direct their course towards a detector to facilitate detection. Neutrons also do not ionize atoms except by direct collision, so gaseous ionization detectors are ineffective.

Detectors relying on neutron absorption are generally more sensitive to low-energy thermal neutrons, and are orders of magnitude less sensitive to high-energy neutrons. Scintillation detectors, on the other hand, have trouble registering the impacts of low-energy neutrons.

Gaseous ionization detectors can be adapted to detect neutrons. While neutrons do not typically cause ionization, the addition of a nuclide with high neutron cross-section allows the detector to respond to neutrons. Nuclides commonly used for this purpose are boron-10, uranium-235 and helium-3. Further refinements are usually necessary to isolate the neutron signal from the effects of other types of radiation. As elemental boron is not gaseous, neutron detectors containing boron use boron trifluoride ($BF_3$) enriched to 96% boron-10 (natural boron is 20% B-10, 80% B-11).

In a typical setup of a neutron detection unit, the incoming particles, comprising neutrons and photons, strike the neutron detector; this is typically a scintillation detector consisting of scintillating material, a waveguide, and a photomultiplier tube (PMT), and will be connected to a data acquisition (DAQ) system to register detection details.

The detection signal from the neutron detector is connected to the scaler unit, gated delay unit, trigger unit and the oscilloscope. The scaler unit is merely used to count the number of incoming particles or events. It does so by incrementing its tally of particles every time it detects a surge in the detector signal from the zero-point. There is very little dead time in this unit, implying that no matter how fast particles are coming in, it is very unlikely for this unit to fail to count an event (e.g., incoming particle). The low dead time is due to sophisticated electronics in this unit, which take little time to recover from the relatively easy task of registering a logical high every time an event occurs. The trigger unit coordinates all the electronics of the system and gives a logical high to these units when the whole setup is ready to record an event run.

The oscilloscope registers a current pulse with every event. The pulse is merely the ionization current in the detector caused by this event plotted against time. The total energy of the incident particle can be found by integrating this current pulse with respect to time to yield the total charge deposited at the end of the PMT. This integration is carried out in an analog-digital converter (ADC). The total deposited charge is a direct measure of the energy of the ionizing particle (neutron or photon) entering the neutron detector. This signal integration technique is an established method for measuring ionization in the detector in nuclear physics. The ADC has a higher dead time than the oscilloscope, which has limited memory and needs to transfer events quickly to the ADC. Thus, the ADC samples out approximately one in every 30 events from the oscilloscope for analysis. Since the typical event rate is around $10^6$ neutrons every second, this sampling will still accumulate thousands of events every second.

The ADC sends its data to a DAQ unit that sorts the data in presentable form for analysis. The key to further analysis lies in the difference between the shape of the photon ionization-current pulse and that of the neutron. The photon pulse is longer at the ends (or "tails") whereas the neutron pulse is well-centered. This fact can be used to identify incoming neutrons and to count the total rate of incoming neutrons. The steps leading to this separation are gated pulse extraction and plotting-the-difference.

Ionization current signals are all pulses with a local peak in between. Using a logical AND gate in continuous time (having a stream of "1" and "0" pulses as one input and the current signal as the other), the tail portion of every current pulse signal is extracted. This gated discrimination method is used on a regular basis on liquid scintillators. The gated delay unit is precisely to this end, and makes a delayed copy of the original signal in such a way that its tail section is seen alongside its main section on the oscilloscope screen.

After extracting the tail, the usual current integration is carried out on both the tail section and the complete signal. This yields two ionization values for each event, which are stored in the event table in the DAQ system.

In this step lies the crucial point of the analysis: the extracted ionization values are plotted. Specifically, the graph plots energy deposition in the tail against energy deposition in the entire signal for a range of neutron energies. Typically, for a given energy, there are many events with the same tail-energy value. In this case, plotted points are simply made denser with more overlapping dots on the two-dimensional plot, and can thus be used to eyeball the number of events corresponding to each energy-deposition. A considerable random fraction (1/30) of all events is plotted on the graph.

If the tail size extracted is a fixed proportion of the total pulse, then there will be two lines on the plot, having different slopes. The line with the greater slope will correspond to photon events and the line with the lesser slope to neutron events. This is precisely because the photon energy deposition current, plotted against time, leaves a longer "tail" than does the neutron deposition plot, giving the photon tail more proportion of the total energy than neutron tails.

The effectiveness of any detection analysis can be seen by its ability to accurately count and separate the number of neutrons and photons striking the detector. Also, the effectiveness of the second and third steps reveals whether event rates in the experiment are manageable. If clear plots can be obtained in the above steps, allowing for easy neutron-photon separation, the detection can be termed effective and the rates manageable. On the other hand, smudging and indistinguishability of data points will not allow for easy separation of events.

Detection rates can be kept low in many ways. Sampling of events can be used to choose only a few events for analysis. If the rates are so high that one event cannot be distinguished from another, physical experimental parameters (shielding, detector-target distance, solid-angle, etc.) can be manipulated to give the lowest rates possible and thus distinguishable events.

It is important here to observe precisely those variables that matter, since there may be false indicators along the way. For example, ionization currents might get periodic high surges, which do not imply high rates but just high energy depositions for stray events. These surges will be tabulated and viewed with cynicism if unjustifiable, especially since there is so much background noise in the setup.

One might ask how experimenters can be sure that every current pulse in the oscilloscope corresponds to exactly one event. This is true because the pulse lasts about 50 ns, allowing for a maximum of $2 \times 10^7$ events every second. This number is much higher than the actual typical rate, which is usually an order of magnitude less, as mentioned above. This means that is it highly unlikely for there to be two particles generating one current pulse. The current pulses last 50 ns each, and start to register the next event after a gap from the previous event.

Although sometimes facilitated by higher incoming neutron energies, neutron detection is generally a difficult task, for all the reasons stated earlier. Thus, better scintillator design is also in the foreground and has been the topic of pursuit ever since the invention of scintillation detectors. Scintillation detectors were invented in 1903 by Crookes but were not very efficient until the PMT (photomultiplier tube) was developed by Curran and Baker in 1944. The PMT gives a reliable and efficient method of detection since it multiplies the detection signal tenfold. Even so, scintillation design has room for improvement as do other options for neutron detection besides scintillation.

It is desirable to provide neutron multiplicity counting utilizing multiple gates, with different definitions of the gate and counting approach, in a parallel analogy designed to reduce pulse pile up dead time. A system is desired that preprocesses neutron data into small files in real time, and reduces processing time required for gigabytes of list mode data.

SUMMARY OF THE INVENTION

It is an object of the present invention to provide a digital data acquisition unit that collects data (e.g., neutron multiplicity data) at high rate and in real-time preprocesses large volumes of data into directly useable forms.

This and other objects will be apparent to those skilled in the art based on the disclosure herein.

Pulses from a multi-detector array are fed in parallel to individual inputs that are tied to individual bits in a digital word. Data is collected by loading a word at the individual bit level in parallel, so that there is no latency such as in a technique that uses a shift register. The word is read at regular intervals, all bits simultaneously, with no manipulation, to minimize latency. The electronics then pass the word to a number of storage locations for subsequent processing, thereby removing the front-end problem of pulse pileup. Latency is therefore limited to the latch time in the counter. The word is used simultaneously in several internal processing schemes that assemble the data in a number of more directly useable forms.

The technique is useful generally for high-speed processing of digital data, and specifically for non-destructive assaying of nuclear material and assemblies for, typically, mass and multiplication of special nuclear material (SNM).

BRIEF DESCRIPTION OF THE DRAWINGS

The accompanying drawings, which are incorporated into and form part of this disclosure, illustrate embodiments of the invention and together with the description, serve to explain the principles of the invention.

FIG. 1 shows the neutron counting requirements matrix of the present invention.

FIG. 5 shows an example of the Mode 1A counting.

FIGS. 6, 7, 8 and 9 are examples of Mode 1B counting.

FIGS. 10 and 11 are examples of Mode 2A counting.

FIGS. 12 and 13 are examples of Mode 2B counting.

FIGS. 14 and 15 are examples of Mode 2C counting.

DETAILED DESCRIPTION OF THE INVENTION

Figure 16:
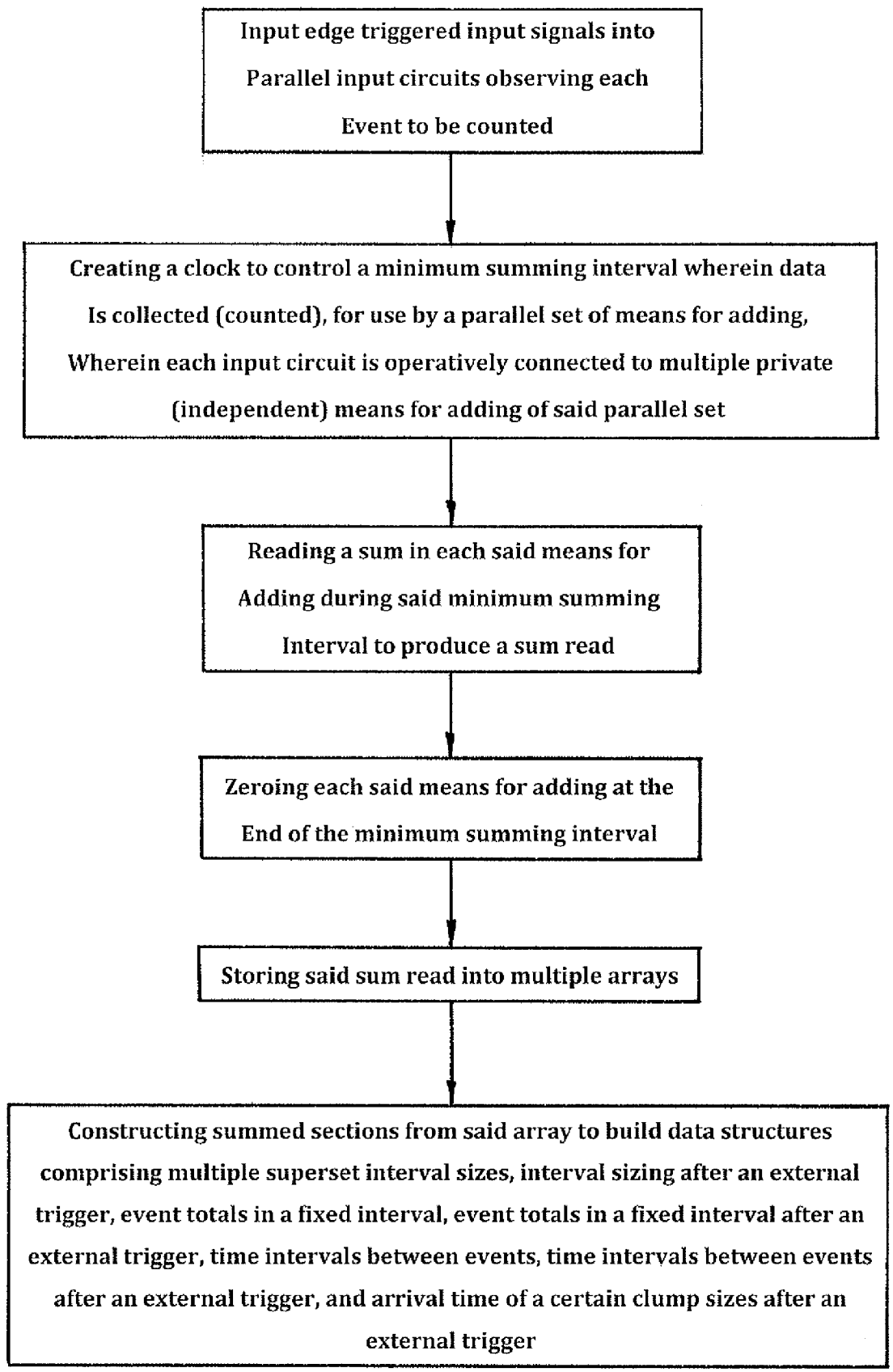
FIG. 16 is a flow chart of an embodiment of the invention.

The invention is a digital data acquisition method and apparatus that collects data at high rate and in real-time preprocesses large volumes of data into directly useable forms. To explain the invention, an exemplary neutron detector system is provided for making measurements on samples that contain fissile material. As shown in the neutron counting requirements matrix of FIG. 1, the system operates in two different modes and performs several classes of measurements. FIG. 16 is a flow chart of an embodiment the present method of event counting comprising: inputting edge triggered input signals into parallel input circuits observing each event to be counted; creating a clock to control a minimum summing interval wherein data is collected (counted), for use by a parallel set of means for adding, wherein each input circuit is operatively connected to multiple private (independent) means for adding of said parallel set; reading a sum in each said means for adding during said minimum summing interval to produce a sum read; zeroing each said means for adding at the end of the minimum summing interval; storing said sum read into multiple arrays; and constructing summed sections from said array to build data structures comprising multiple superset interval sizes, interval sizing after an external trigger, event totals in a fixed interval, event totals in a fixed interval after an external trigger, time intervals between events, time intervals between events after an external trigger, and arrival time of certain clump sizes after an external trigger. A second embodiment of the present method of event counting comprises: inputting input signals into parallel input circuits observing each event to be counted; controlling a minimum summing interval in which data is counted for use by a parallel set of means for adding; producing a sum read; zeroing each said means for adding; storing said sum read; and building data structures. In this second method, wherein said input signals may be edge triggered. The minimum summing interval is controlled with a clock. Each input circuit is operatively connected to multiple independent means for adding of said parallel set. The sum read is produced by reading a sum in each said means for adding during said minimum summing interval. The means for adding are zeroed at the end of a minimum summing interval. The sum read may be stored into multiple arrays. Data structures are built by constructing summed sections from said array and may comprise data selected from the group consisting of multiple superset interval sizes, interval sizing after an external trigger, event totals in a fixed interval, event totals in a fixed interval after an external trigger, time intervals between events, time intervals between events after an external trigger, and arrival time of certain clump sizes after an external trigger. The data structures may comprise multiple superset interval sizes, interval sizing after an external trigger, event totals in a fixed interval, event totals in a fixed interval after an external trigger, time intervals between events, time intervals between events after an external trigger, and arrival time of certain clump sizes after an external trigger. An apparatus for event counting according to the present invention comprises: means for inputting input signals into parallel input circuits observing each event to be counted; means for controlling a minimum summing interval in which data is counted for use by a parallel set of means for adding; means for producing a sum read; means for zeroing each said means for adding; means for storing said sum read; and means for building data structures.

One may also describe the two modes as three modes: self triggered mode I, self triggered mode II and externally triggered mode II. Mode II counting when self-triggered is internally triggered like mode I. Mode II external trigger is typically called the neutron generator triggered counting.

Figure 2A:
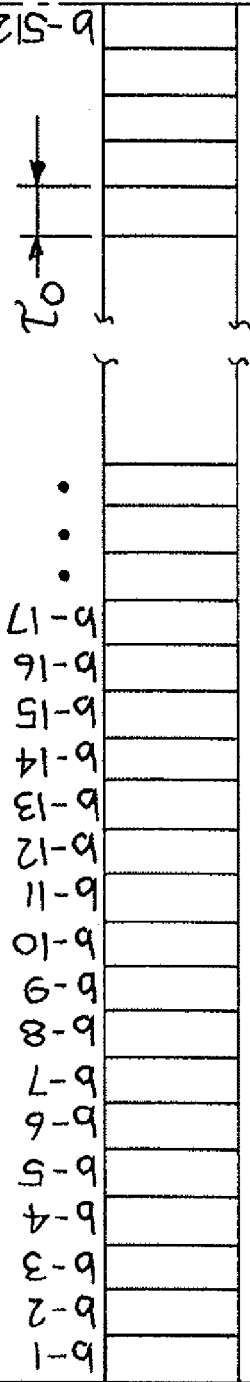
FIG. 2 defines DAG nomenclature.
Figure 2A:
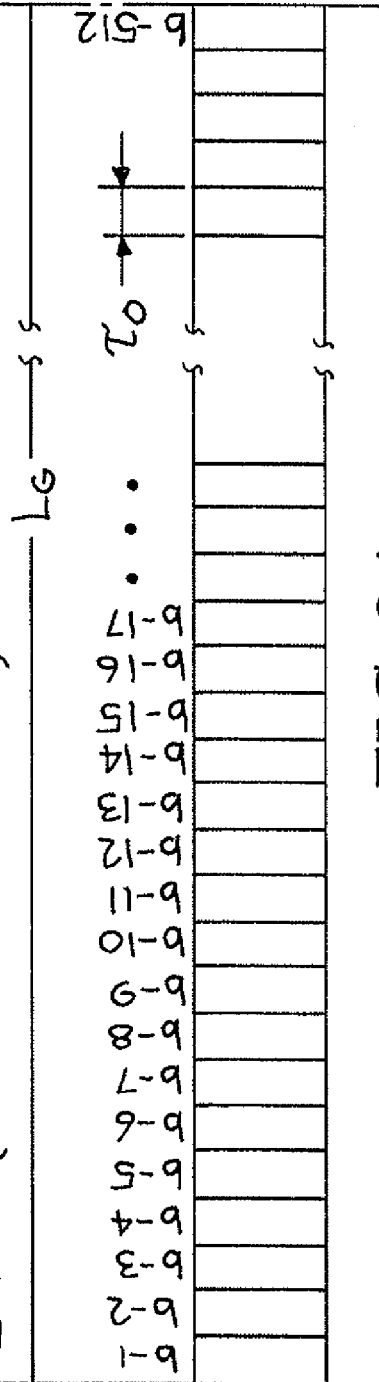
Figure 2B:
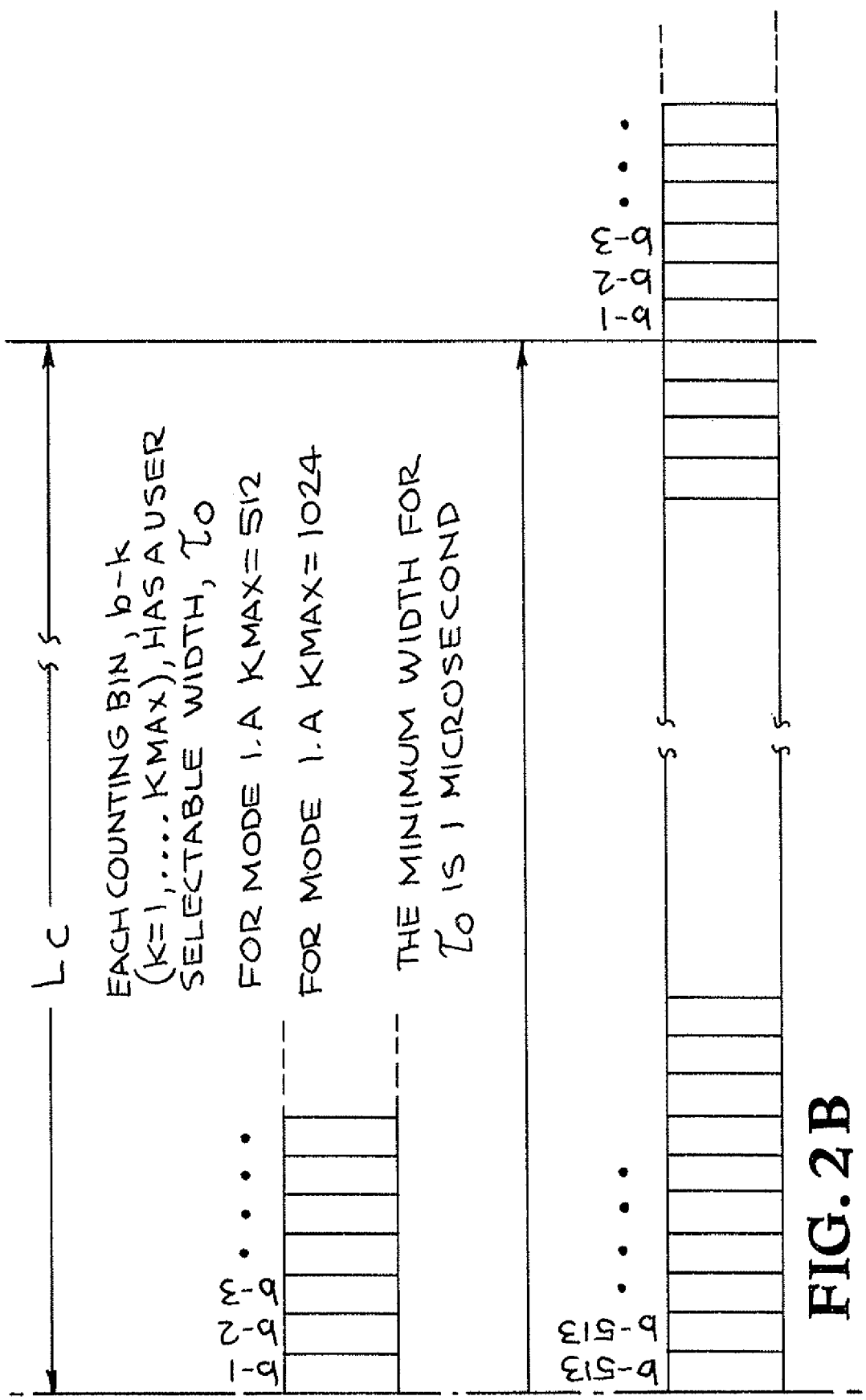
Figure 3A:
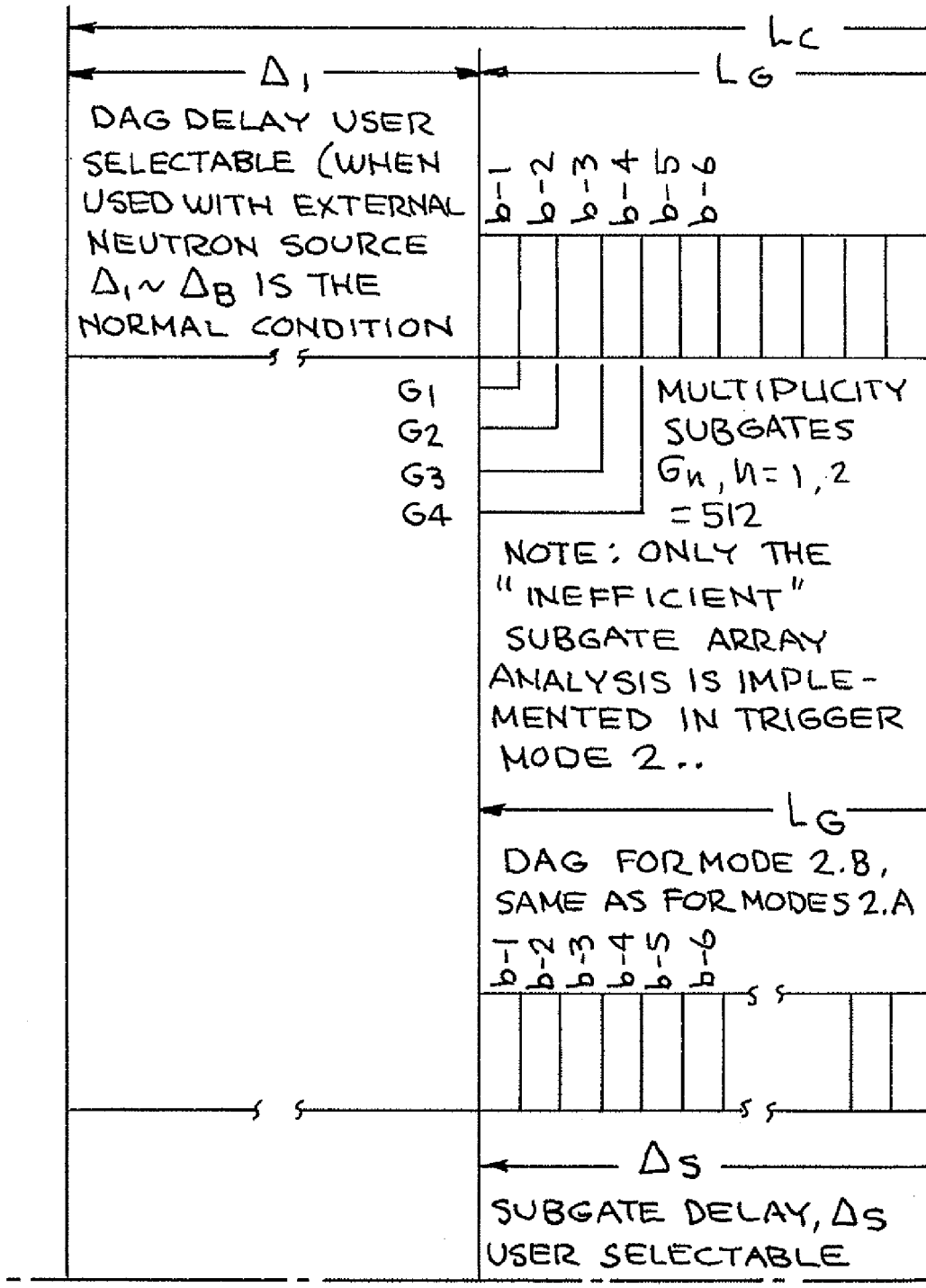
FIG. 3 illustrates the time correlation of the DAGs and the induced-fission neutrons emitted by the sample.
Figure 3B:
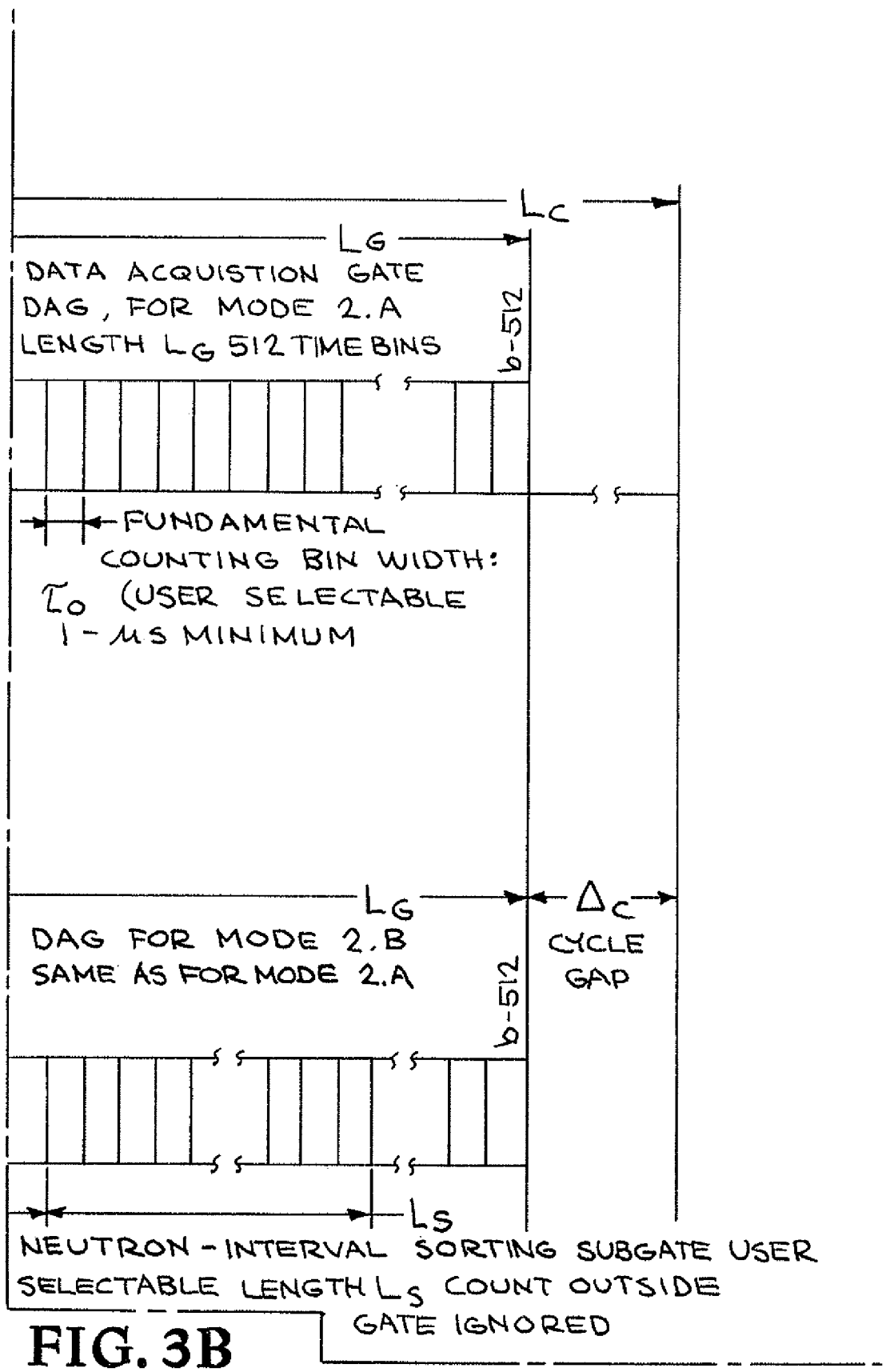
Figure 3C:
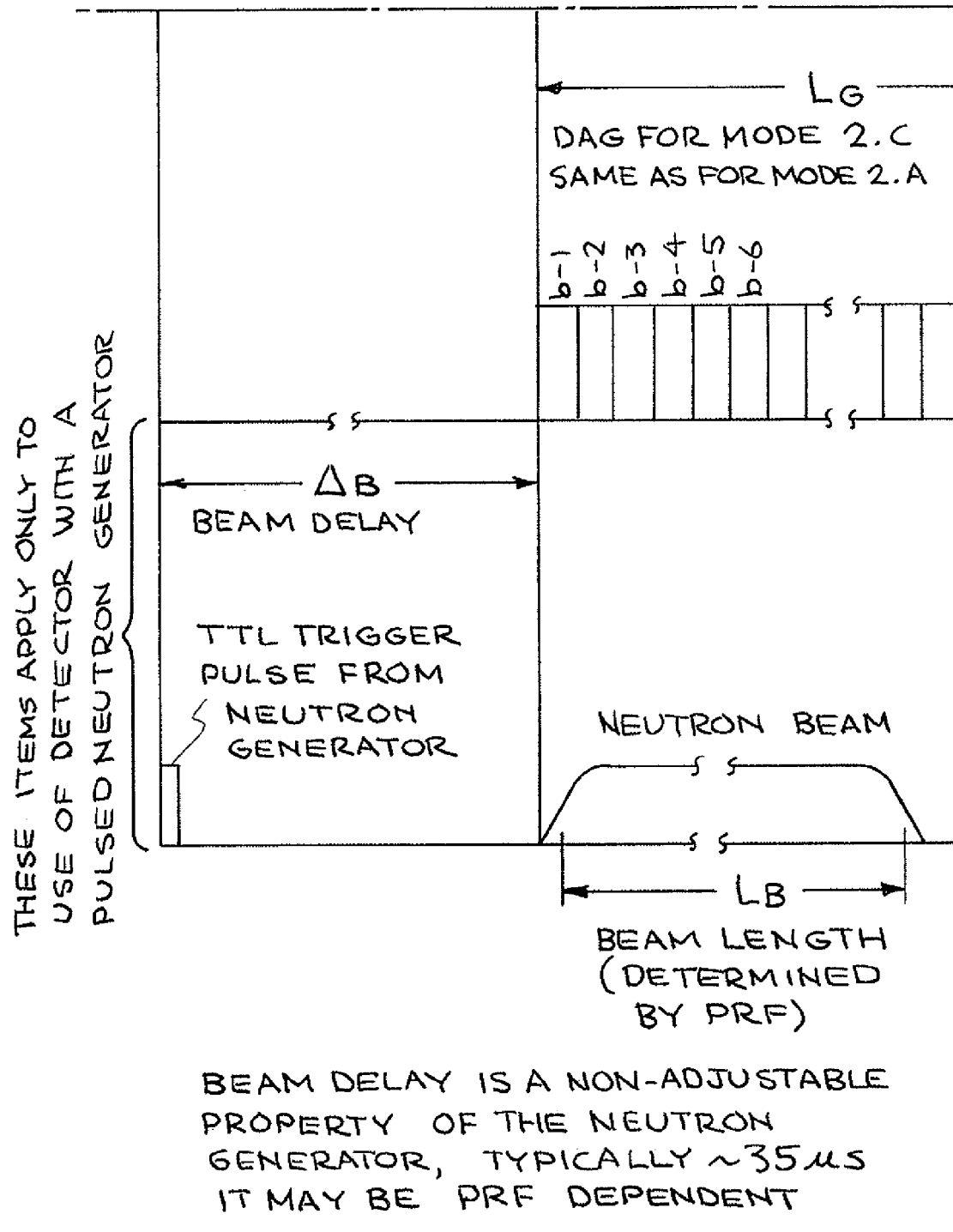
Figure 3D:
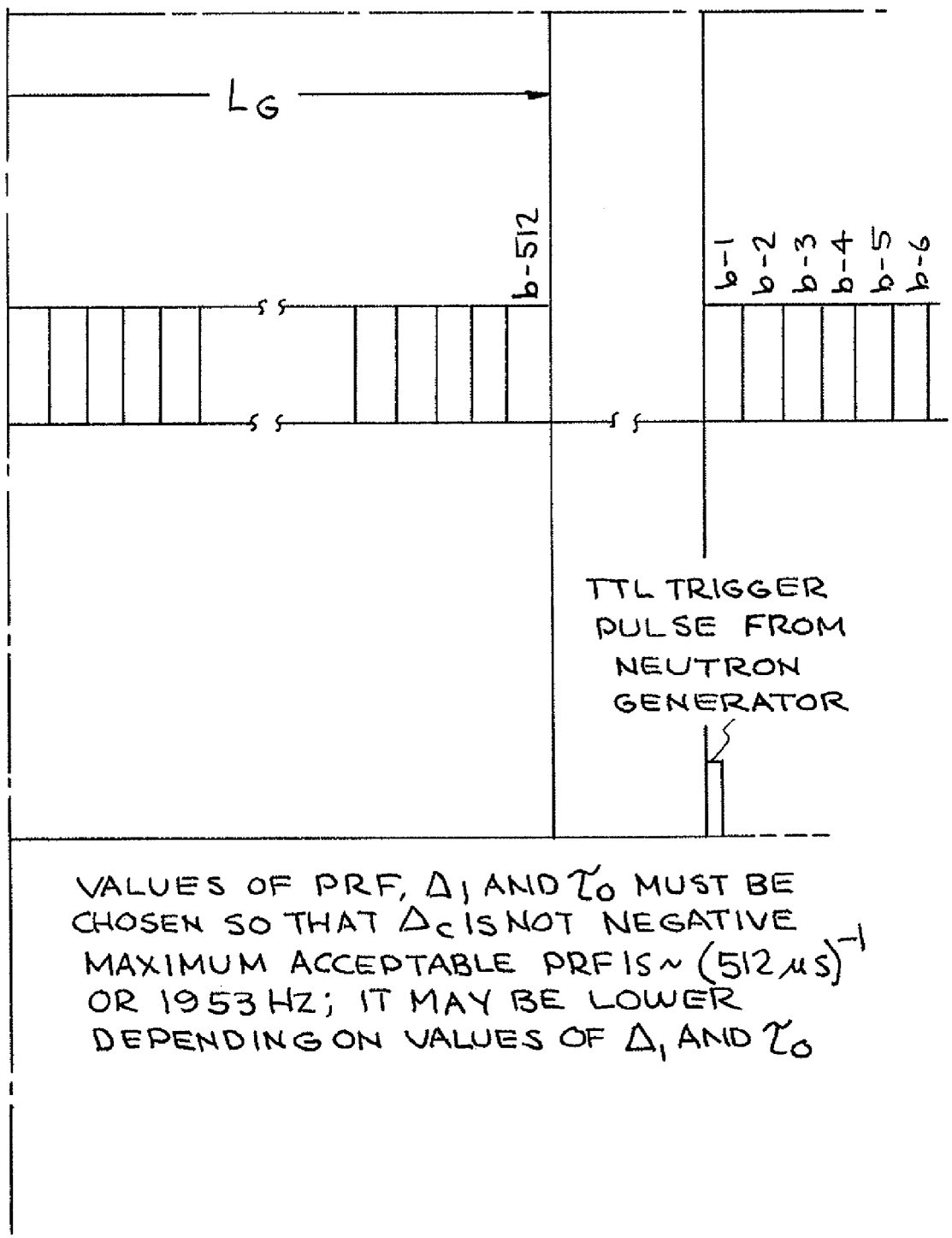

Mode I will be used for making measurements of neutrons generated by the natural radioactivity of the sample material. In this mode the detector system will employ internally generated, periodic triggers to detect neutrons in data acquisition gates (DAGs). DAG nomenclature is defined in FIG. 2. In this mode, the DAGs are uncorrelated with the neutron emission times. See FIGS. 1 and 2.

Mode II will be required for measurements on samples with very low natural neutron activity; it may also be useful for measurements on some samples with higher natural activity. Most of the neutrons detected in this mode will be generated by interactions (mainly induced fission) initiated by pulses of 14-MeV neutrons injected into the sample material by an ion-tube (D,T) neutron generator. The periodic triggers for the detector, in this mode, are provided by the neutron generator, at a fixed time relative to the 14-MeV neutron pulses. The DAGs and the induced-fission neutrons emitted by the sample are thus highly correlated in time. See FIGS. 1 and 3.

In both Mode I and Mode II, two classes of measurements (Class A and Class B) are required, and a third class (Class C) can provide valuable information in Mode II, but is not applicable to Mode I. For each class of measurement the neutrons detected within the DAGs must be sorted in different ways. In order to minimize overall data collection time, it is necessary to carry out the various classes of measurements (i.e., implement the different data sorting algorithms) simultaneously. (There may be cases, in Mode II, in which different Beam Delays are required for different measurement classes, which would require separate measurements.)

Figure 4B:
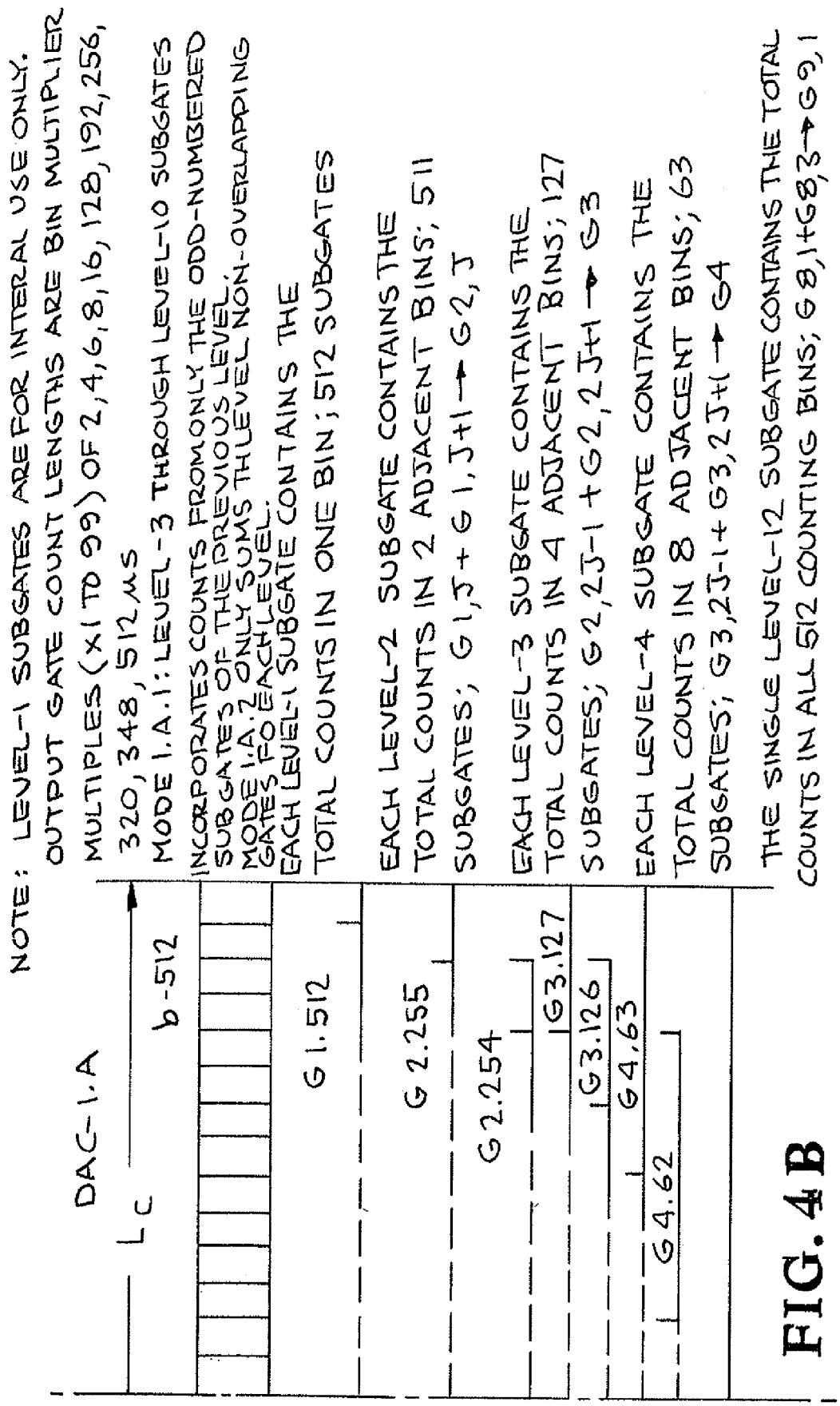
FIG. 4 shows examples of subgate detail.
Figure 6A:
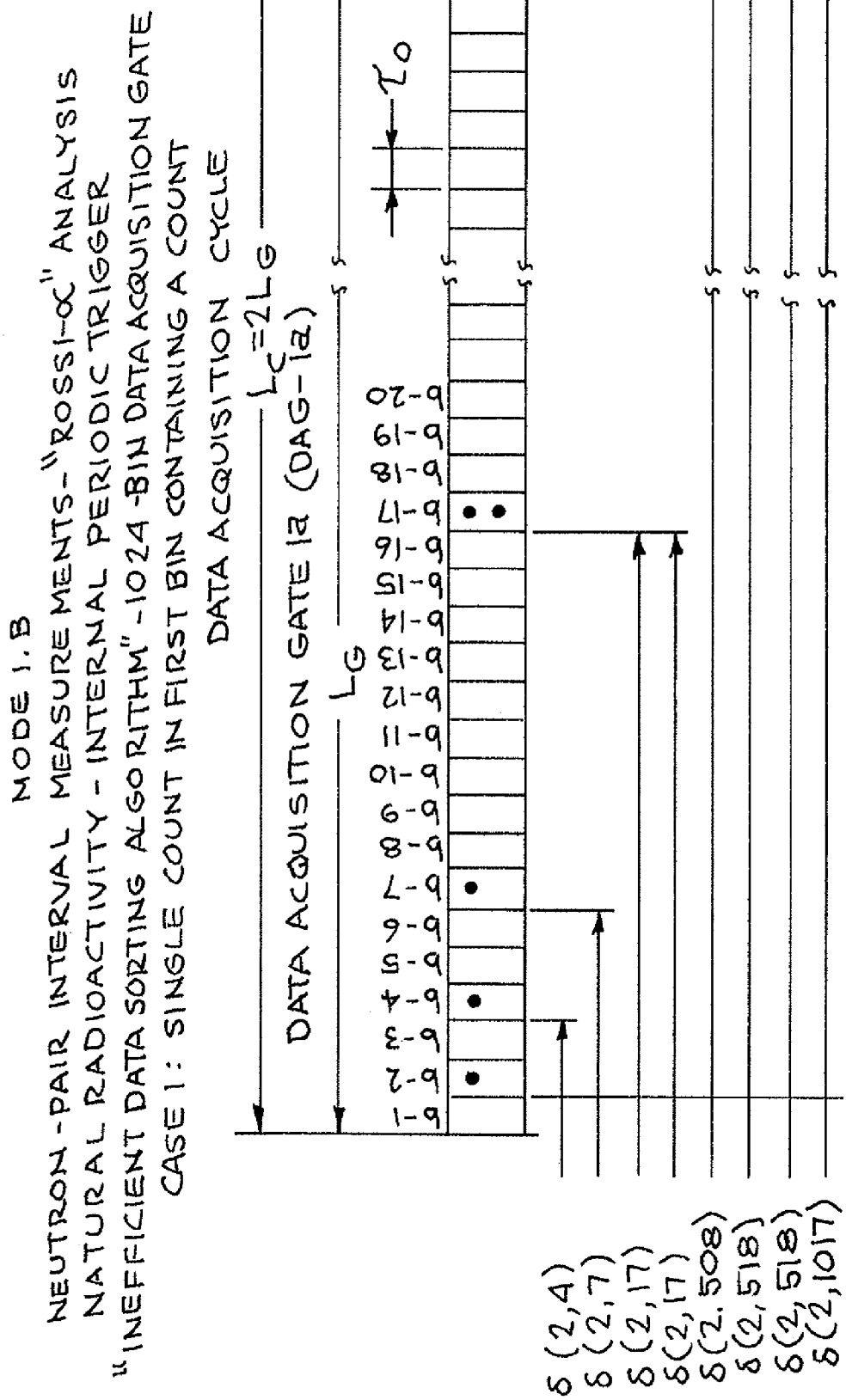
Figure 6B:
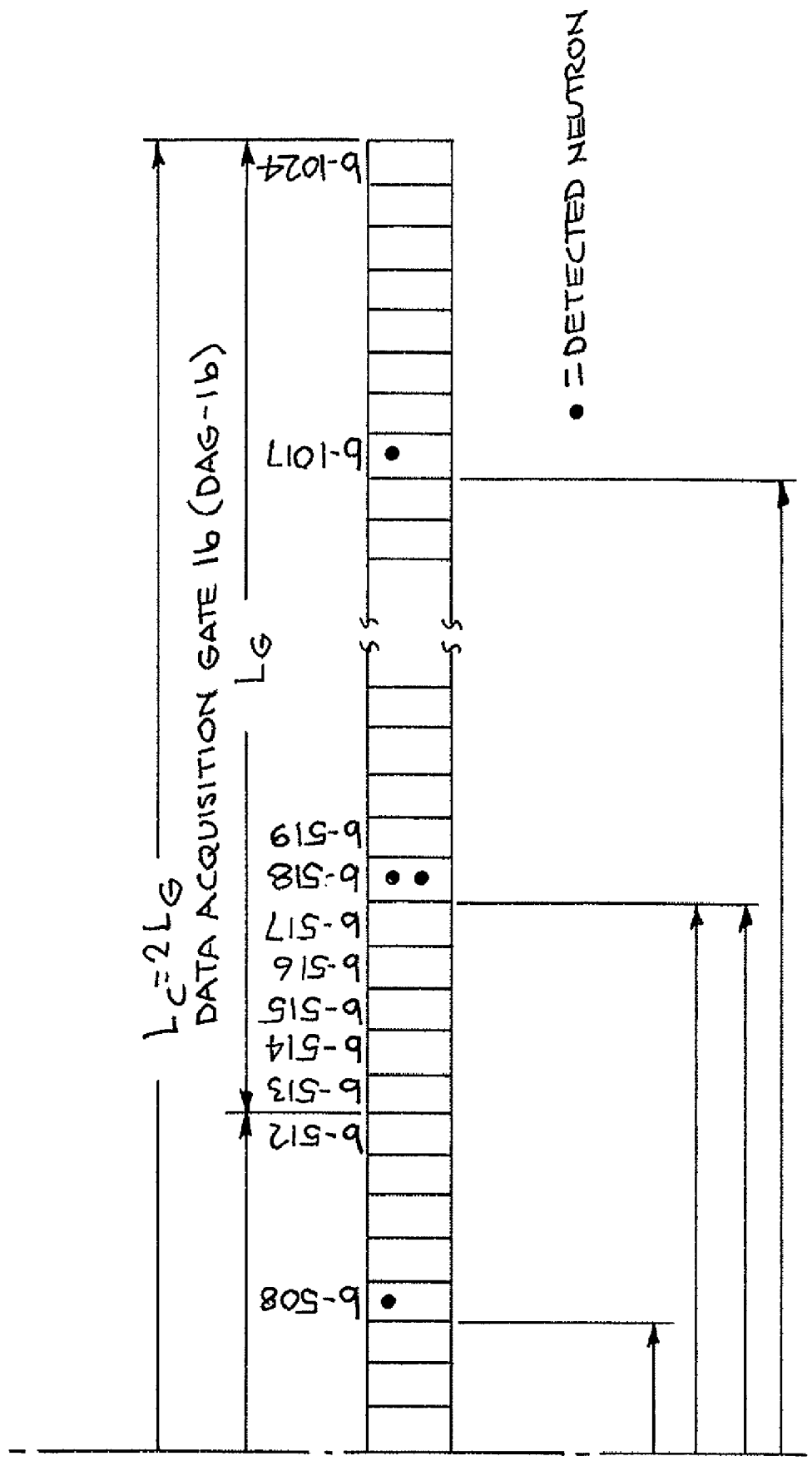
Figure 8A:
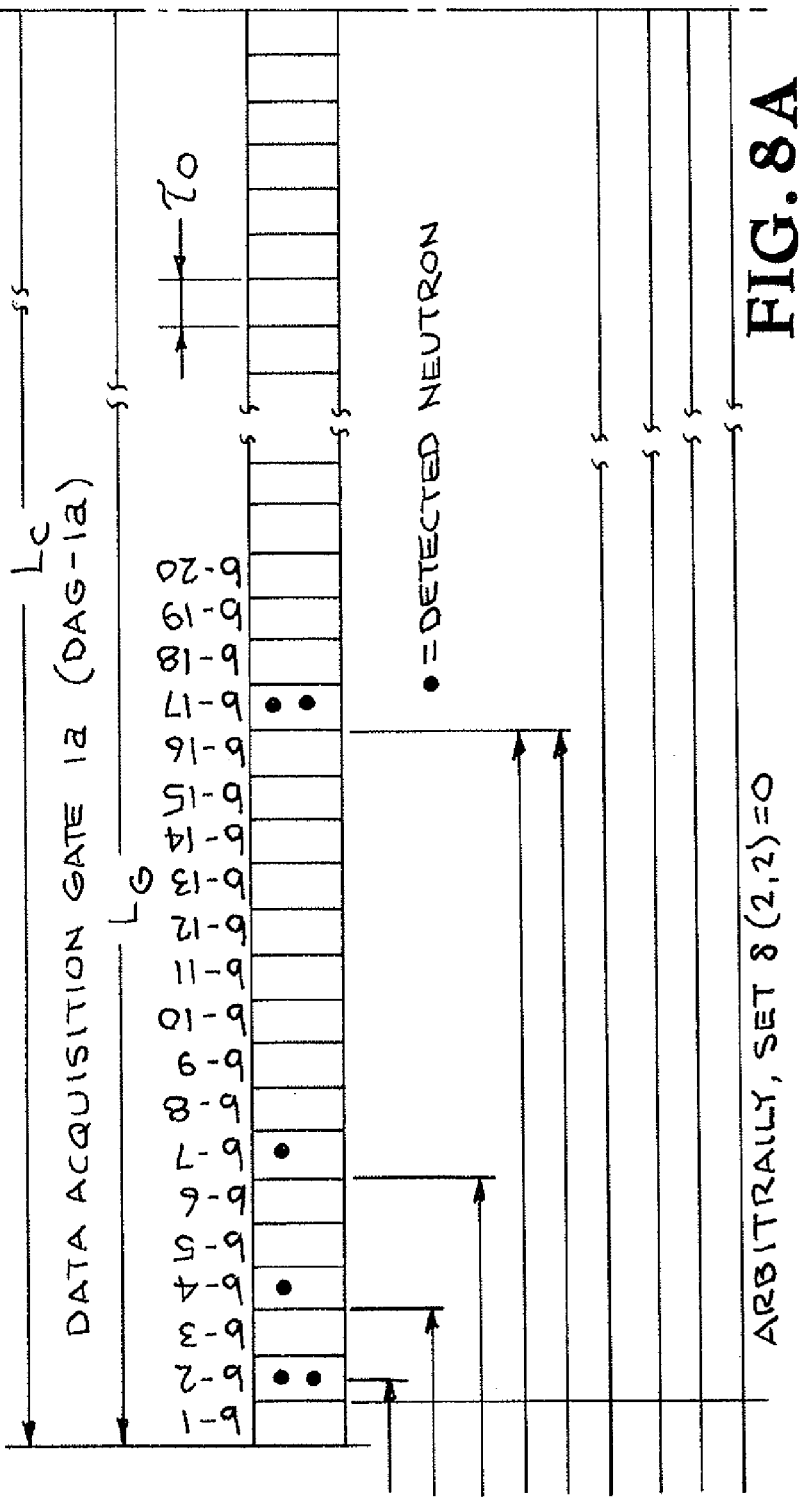
Figure 8B:
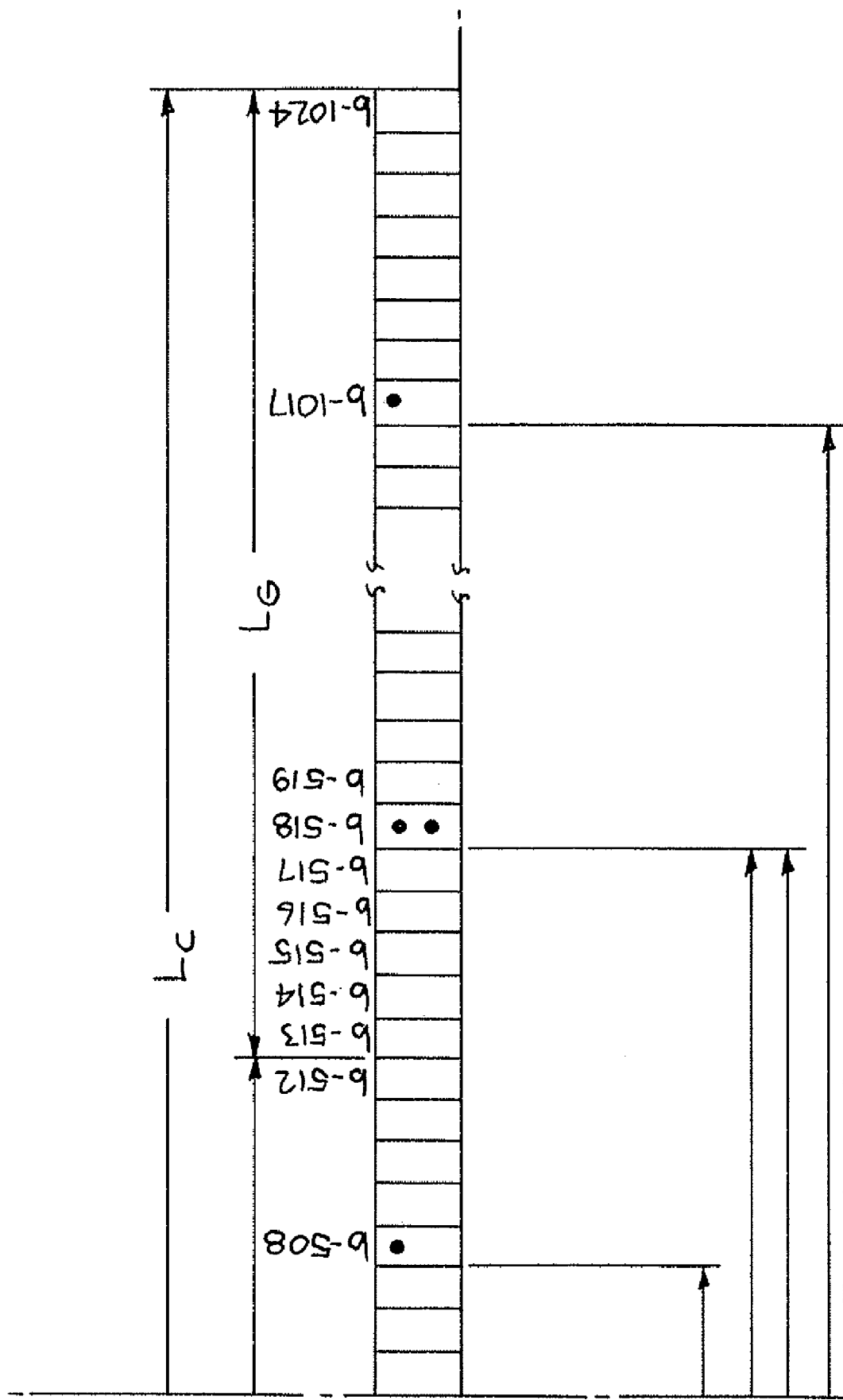
Figure 9B:
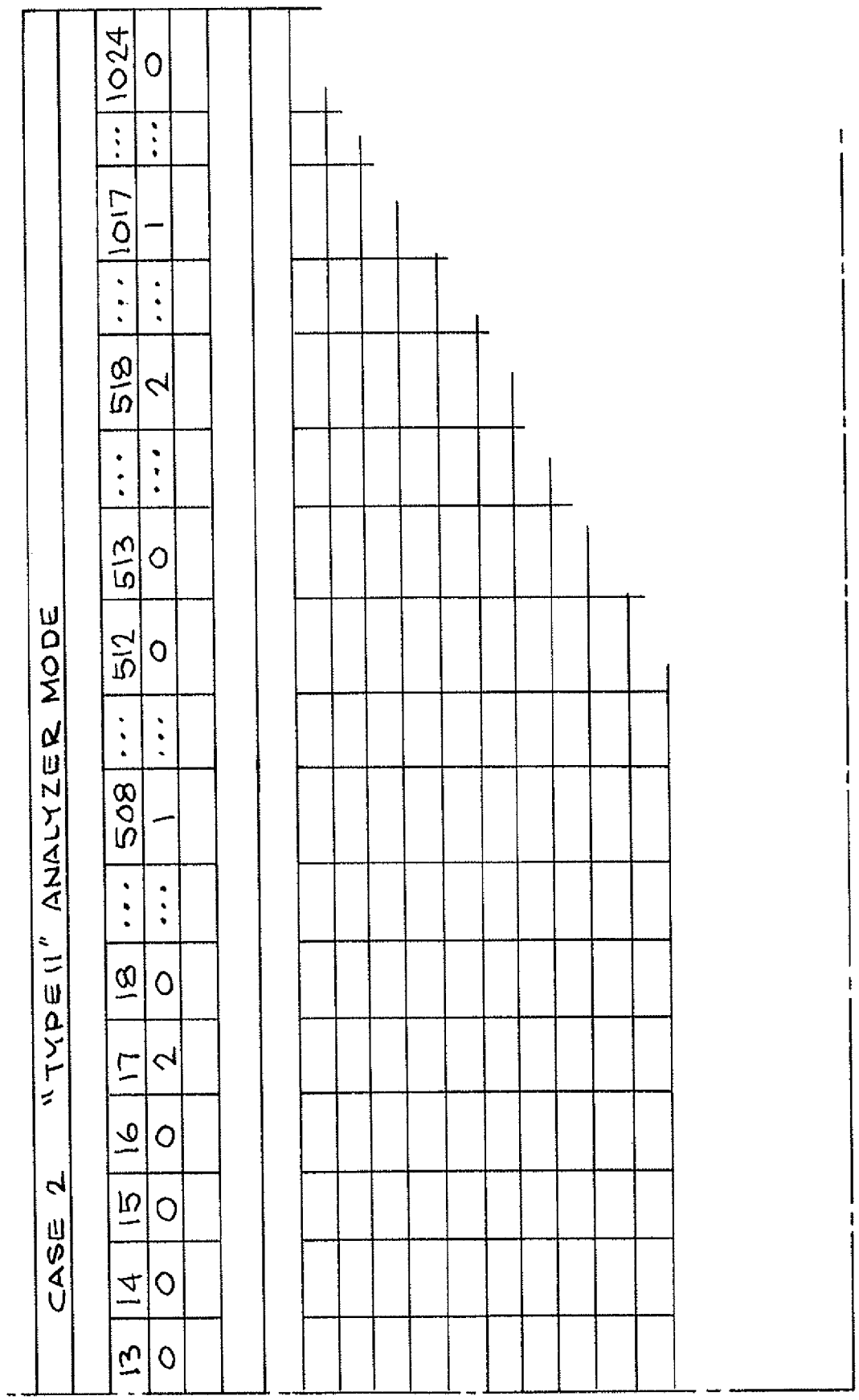
Figure 10:
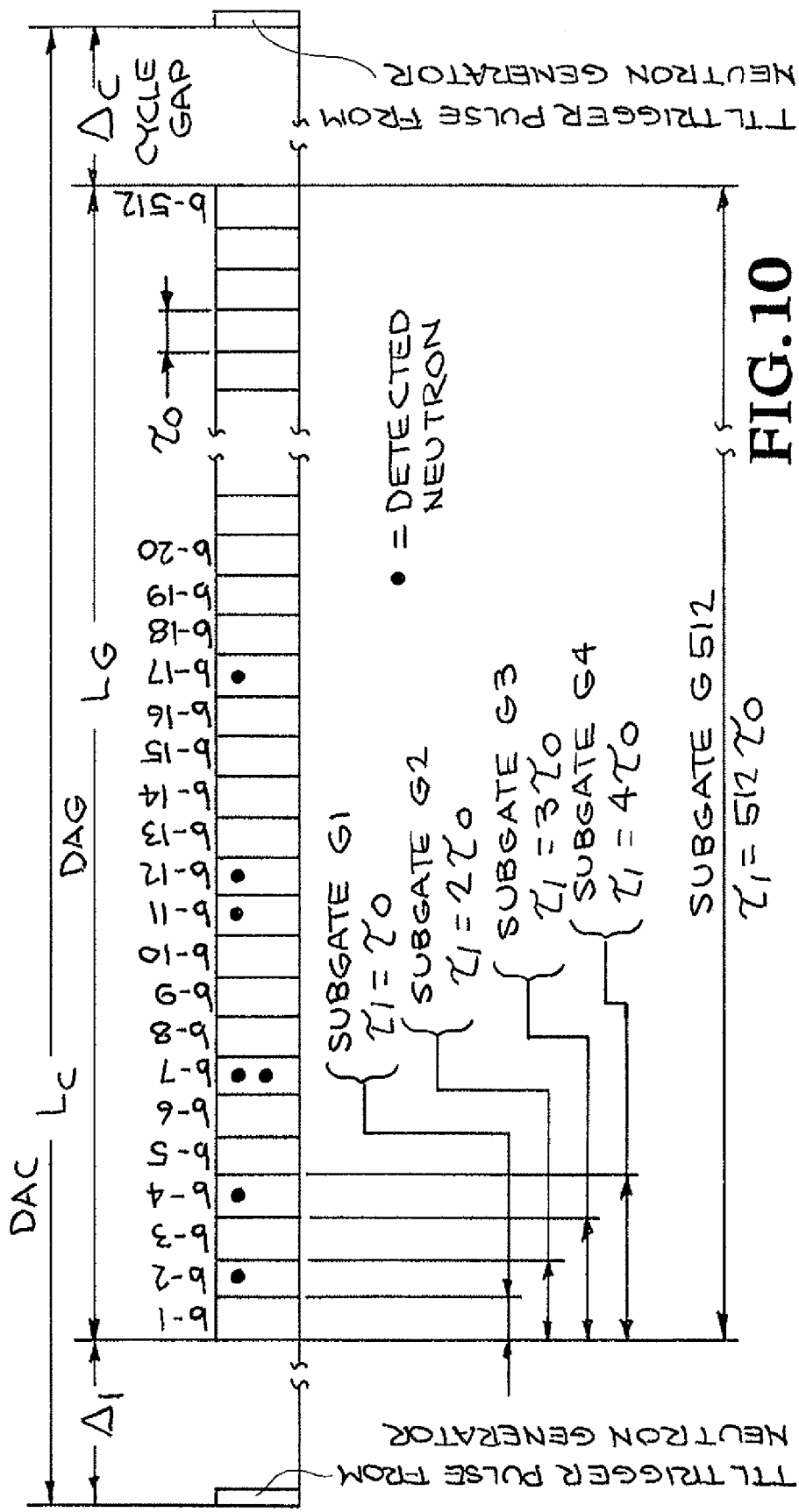

Class A: In this class of measurement data will be sorted to record statistics on neutron multiplicities detected within temporal sub-gates with different widths. A Feynman Variance type of analysis can be carried out with these data. Although the same data sorting algorithm (the "Inefficient Implementation") can be used for both Mode I and Mode II measurements, other sorting algorithms can greatly improve data collection efficiency in Mode I. It is feasible to implement at least one of these (the "Efficient Implementation"). FIGS. 4 and 5 are an example of the Mode 1A. FIGS. 10 and 11 are examples of Mode 2A.

Figure 12A:
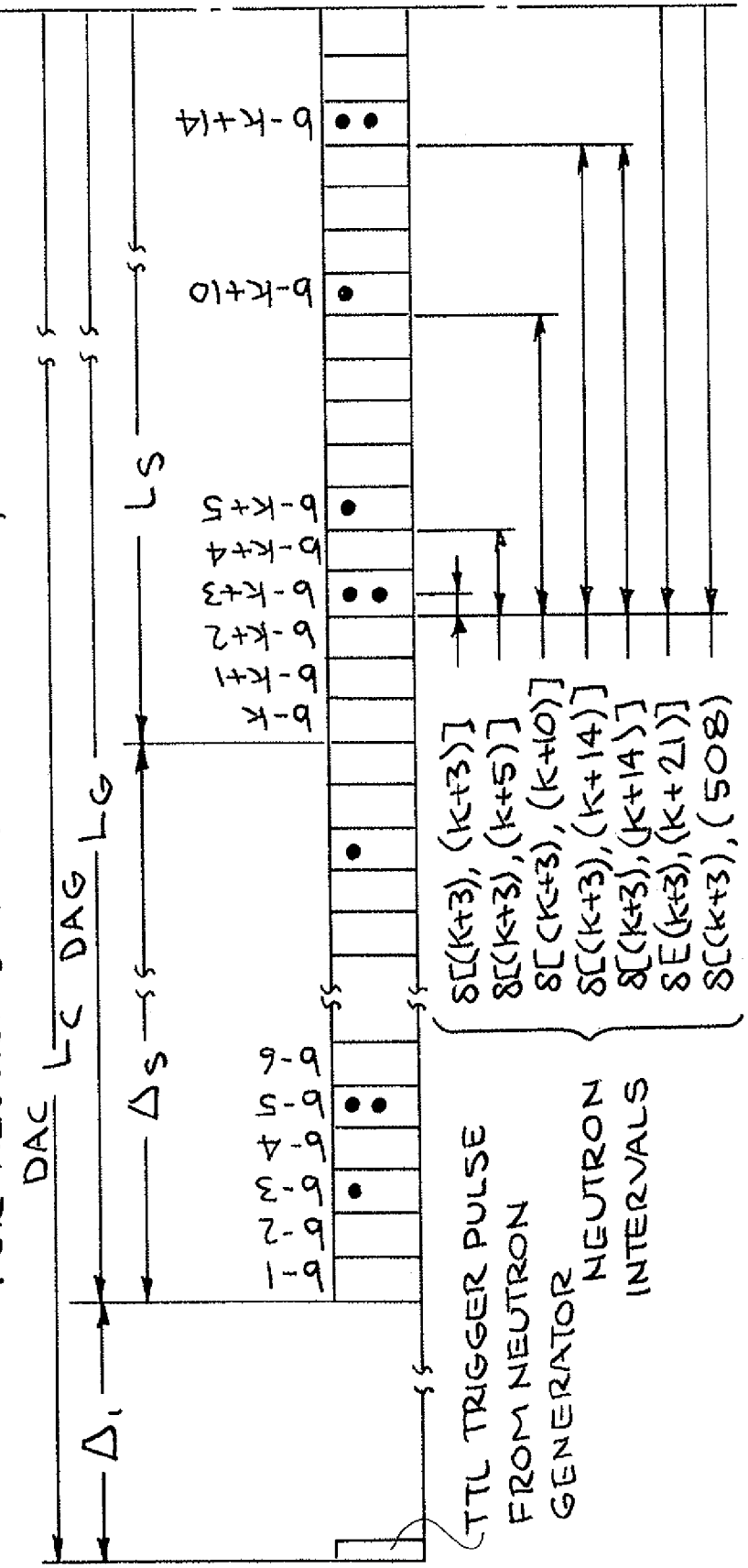
Figure 12B:
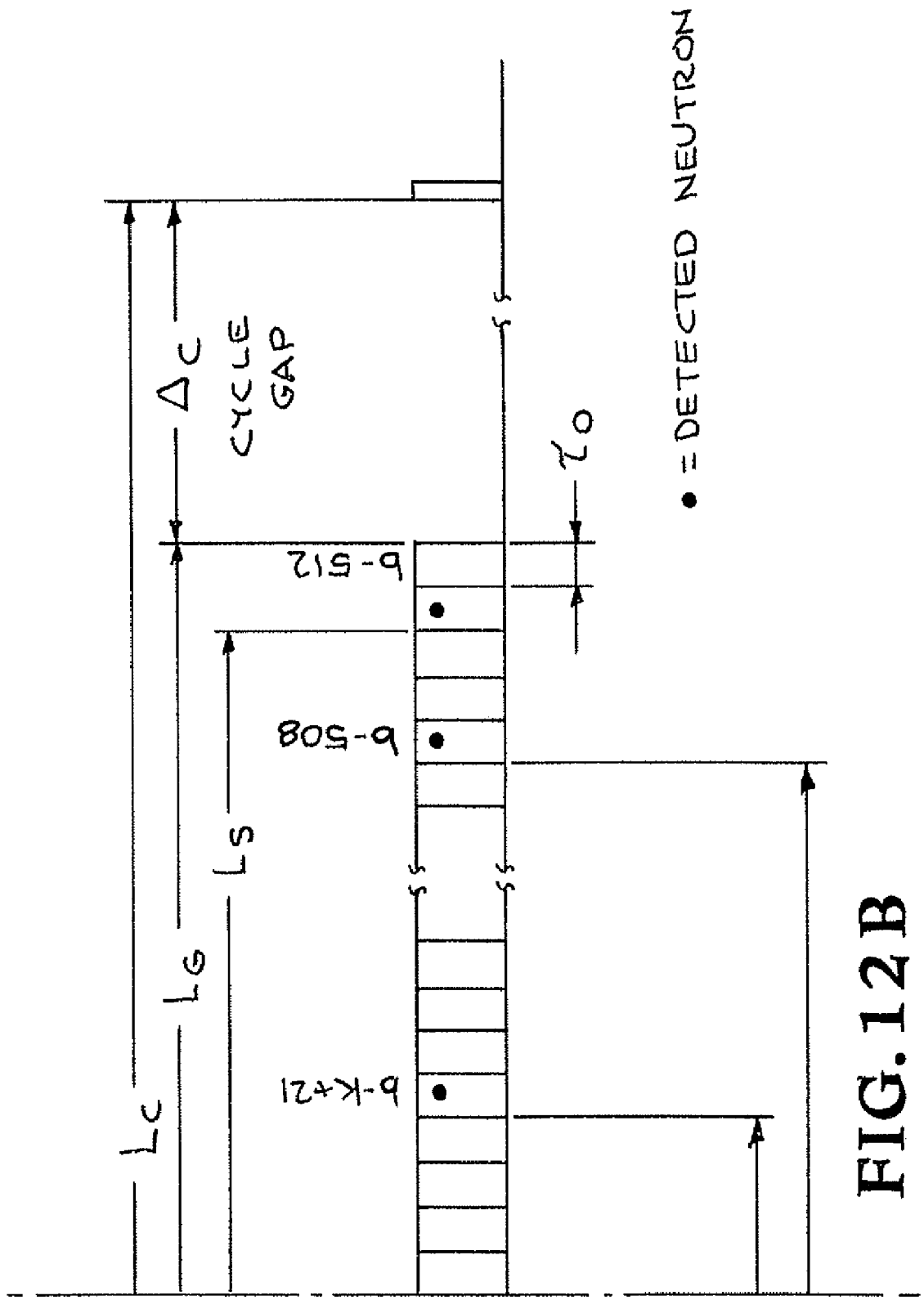

Class B: In this class of measurement data will be sorted to record statistics on the time intervals between successive neutrons detected within the DAGs. A Rossi-Alpha type of analysis can be carried out with these data. The same data sorting algorithm applies for both Mode I and Mode II. FIGS. 12 and 13 are examples of Mode 2B counting. FIGS. 6, 7, 8 and 9 are examples of Mode 1B type of counting.

Figure 14:
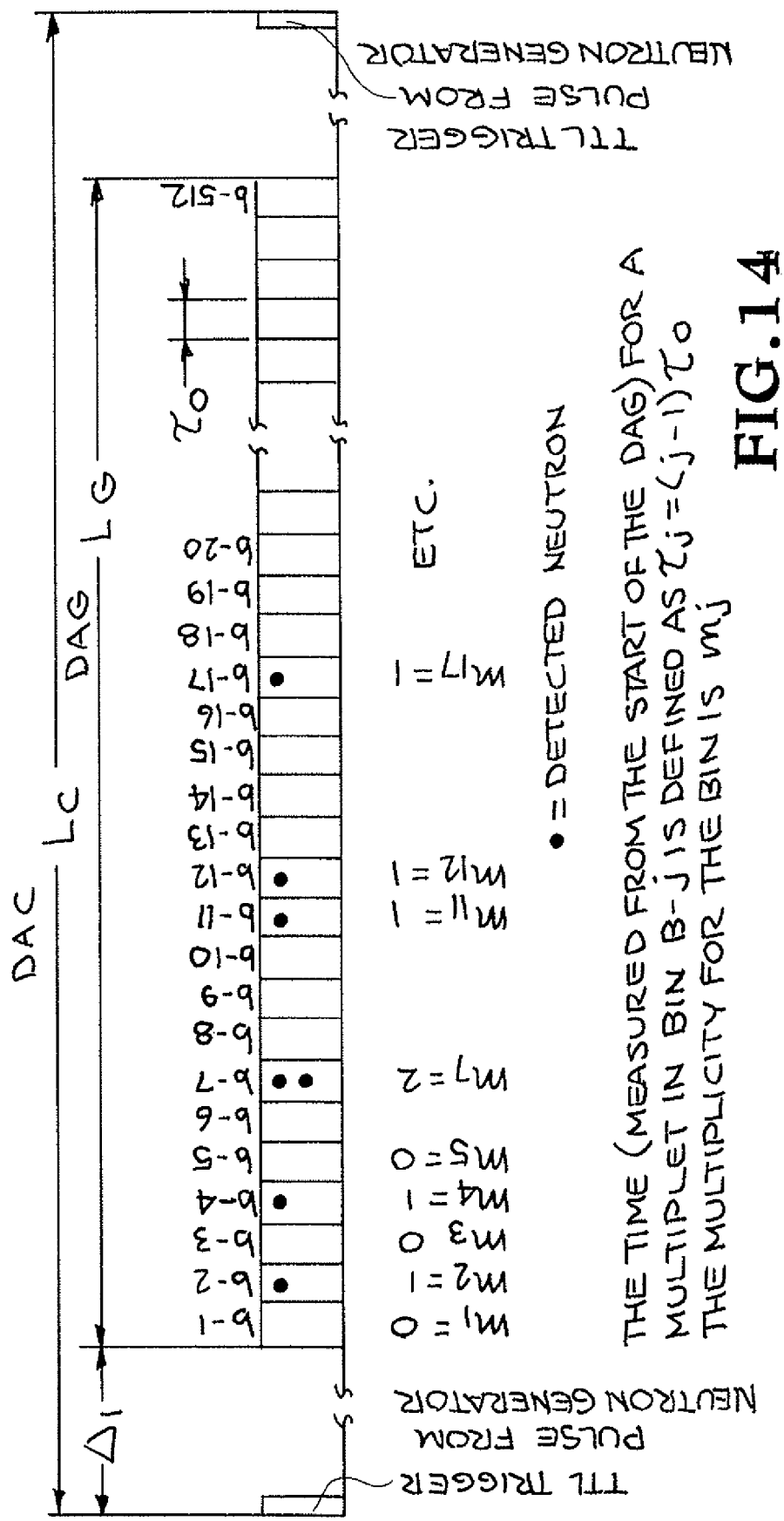

Class C: In this class of measurement data are sorted according to the number of multiplets in each time bin within the data acquisition gate. These data allow one to measure the neutron die-away following the injection of the e.g., 14-MeV neutron pulse into the sample. FIGS. 14 and 15 are examples of Mode 2C counting.

In summary, four different data sorting algorithms (depending on how you choose to categorize the counting modes) must be implemented in order to carry out all of the classes of analysis that are necessary for both Mode I and Mode II measurements, although only two are applicable in Mode I and only three are applicable in Mode II. It is desirable to implement simultaneous sorting of data by all four algorithms for all measurements, in order to simplify field operation of the detector system. Analyses will be carried out, of course, only on the data sets applicable for a particular mode.

The current neutron detectors consist of several (typically 14) $^3$He proportional-counter tubes embedded in a polyethylene moderator. The tubes may be in a single pod or in a pair of pods. The output pulses from the tubes are fed to an electronic module containing amplifiers and pulse-sorting circuitry.

The electronics module has four principal functions: 1) It supplies the high-voltage to the $^3$He tubes and power for the electronic counting circuitry from a self-contained battery pack. 2) It permits user selection of a) one of the two triggering modes, internal (Mode I) or external (Mode II), b) a "Start Delay," $\Delta_1$, for Mode II (set to the minimum value, 1-µs, for Mode I), c) the width, $\tau_o$, of the fundamental data-sorting time bins (minimum value currently restricted to I µs), and d) the number of Data Acquisition Cycles (DACs) for the measurement (typically $10^5$-$10^8$). 3) It amplifies and shapes the analog output signals from each tube (separate amplifier and discriminator for each tube) and feeds the signals to a data collection and sorting system. 4) It sorts the data collected on each DAC into the four data matrices required for the different modes and analysis types, and appropriately increments the cumulative data matrices at the end of each DAC. It outputs the cumulative data matrices at the end of each measurement.

The electronics module will also display and/or print the average total counting rate in units of neutrons/DAG to allow the operator to adjust the length of the DAG and/or the sample-to-detector distance to achieve good data collection efficiency. It may also print a reminder to the operator that the number of neutrons/DAG needs to be large. (Since the number of counting bins will be fixed at 256, the length of the DAG is determined by the value of $\tau_o$ that is set).

The schematic representations of the neutron beam and the Beam Delay ($\Delta_o$) shown in FIG. 3 apply only to Mode II. When wanting data from Mode L the 14-MeV neutron generator (i.e., external trigger input) is not used. The start pulse for the DAC is generated internally. The delay, $\Delta_2$, is essentially zero, and $\Delta_1$ is kept at the minimum value consistent with the triggering and data sorting requirements for the cycle (approximately 1-µs). The user-selected value, $\tau_o$, of the fundamental counting bin width, therefore, determines $L_G$ (the number of bins is fixed at 256), and (together with the fixed value of $\Delta_1$) the length of the DAC ($L_C$) and, of course, its inverse, the pulse repetition frequency (PRF).

In Mode II, the user selects the values of $\tau_o$. $\Delta_1$, and the PRF of the neutron generator (within the operational limits of approximately 500-5000 Hz). The neutron generator control module provides a TTL output pulse that serves as the DAC start pulse. The neutron output from the generator occurs at a delay, $\Delta_0$, approximately 20-40 us after the start of the TTL pulse. The duration of the neutron beam pulse is determined by the selected PRF and the neutron generator duty factor (nominally fixed by the manufacturer at some value in the 5-10% range, but, in practice, somewhat PRF dependent). FIGS. 3, 10, 12 and 14 show timing marks.

The number of time bins in the DAG will be fixed at 256. Each bin has the same width, $\tau_o$, which can be selected by the user to adjust the length of the DAG as required by the measurement to be made. The minimum value of $\tau_o$ is fixed at one microsecond by the current electronics in the system. The sum of neutron counts from all of the $^3$He tubes in the detector is recorded in each time bin. See FIGS. 2 and 3.

$\Delta_1$ is kept to its minimum value and $\Delta_2$ is set to zero in Mode I, in order to maximize data acquisition efficiency. In Mode II, $L_G$, $\Delta_1$, and $L_C$ can all be set by the user. If these choices are not made judiciously [i.e., if $L_C<(L_G+\Delta_1)$], one could get a negative value of $\Delta_2$! See FIG. 3.

In Mode II, the measurement requirements may require the neutron "beam" to be positioned entirely prior to the start of the DAG, more or less coincident with the DAG, or overlapping part of the DAG. Variability of the PRF, $\Delta_1$, and $\tau_o$ allows such flexibility in beam position. Note that the beginning and end of the neutron "beam" is not well defined in time. Also, the term "beam" is used loosely, here; the 14-MeV neutrons are emitted isotropically by generator, and do not form a spatial beam in the usual sense of the word. See FIG. 3.

FIGS. 4 and 10 show examples of subgate detail. FIG. 12 illustrates another type of subgate counting. The Level-1 subgates shown are equivalent to the fundamental Time Bins. In principle, each Level-1 subgate could comprise 2 or more bins. If longer Level-1 subgates are required, this can be achieved, in the implementation shown, by increasing the size of $\tau_o$. It is possible, in principle, to implement a data-sorting algorithm that contains more subgates of Level-2 and higher. There are possible modifications of the current implementation (containing the same numbers of subgates of each level) in which some of the longer subgates could comprise different groupings of time bins than the ones indicated in the figure. On any given DAC, the neutron multiplicities in some of those subgates would generally differ from the multiplicities in the illustrated set of subgates. The total multiplicity count in all subgates of a given length would, over a measurement of many DACs, be statistically equivalent for all such variations of the implementation shown.

Referring now to FIGS. 6, 8, 12 and 14: (a) The average number of neutrons per DAG needs to be large. Any data acquisition cycles on which only zero or one neutron is detected provide no useful data for the Rossi-Alpha analysis. In order to collect data efficiently, it is necessary that an average of several (say $\geq 10$) neutrons be detected on each cycle. (b) If two neutrons are counted in a single bin, we consider the earlier of the two to be the second member of a neutron pair with the nearest preceding neutron; the later neutron is the first member of a pair with the next succeeding neutron; and the two neutrons, themselves, constitute a pair separated by a time interval smaller than $\tau_o$. We arbitrarily define this to be a time interval of "zero" width. If three neutrons occur in a single bin, we have two intervals of zero width, etc.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:

1. A method for counting neutrons, comprising:
   collecting neutrons in a multi-detector array;
   generating a plurality of digital words by feeding pulses from said multidetector array in parallel to a plurality of separate inputs, wherein each input of said plurality of inputs is tied to an individual bit in a digital word of the plurality of digital words;
   reading each said digital word at regular intervals to produce a plurality of read and digitized words, wherein all bits are read simultaneously to minimize latency; and
   storing each read and digitized word of said plurality of read and digitized words, wherein each read and digitized word is stored in a number of storage locations for subsequent processing, thereby reducing front-end pulse pileup.

2. A method of event counting, comprising:
   collecting neutron data as input signals in parallel input circuits;
   counting the collected neutron data in one or more summing intervals created by a clock;
   controlling a minimum summing interval for counting said data;
   summing said data in said summing interval to produce a data sum;
   storing said sum in multiple arrays; and
   building data structures by constructing summed sections from each said array of said multiple arrays.

3. The method of claim 2, wherein said input signals are edge triggered.

4. The method of claim 2, wherein said minimum summing interval is controlled with a clock.

5. The method of claim 2, wherein said data structures comprise data selected from the group consisting of multiple superset interval sizes, interval sizing after an external trigger, event totals in a fixed interval, event totals in a fixed interval after an external trigger, time intervals between events, time intervals between events after an external trigger, and arrival time of certain clump sizes after an external trigger.

6. The method of claim 2, wherein said data structures comprise multiple superset interval sizes, interval sizing after an external trigger, event totals in a fixed interval, event totals in a fixed interval after an external trigger, time intervals between events, time intervals between events after an external trigger, and arrival time of certain clump sizes after an external trigger.

7. A method of neutron event counting, comprising:
   inputting edge triggered input signals into parallel input circuits observing each neutron event to be counted;
   counting each neutron event in one or more summing intervals created by a clock;
   controlling a minimum summing interval for counting each neutron event, for use by a parallel set of means for adding, wherein each input circuit of said input circuits is operatively connected to multiple independent means for adding of said parallel set;
   reading a sum in each said means for adding during said minimum summing interval to produce a sum read;
   zeroing each said means for adding at the end of the minimum summing interval;
   storing said sum read into multiple arrays; and
   constructing summed sections from said array to build data structures comprising multiple superset interval sizes, interval sizing after an external trigger, event totals in a fixed interval, event totals in a fixed interval after an external trigger, time intervals between events, time intervals between events after an external trigger, and arrival time of certain clump sizes after an external trigger.

* * * * *